United States Patent
Adachi et al.

(10) Patent No.: US 10,997,458 B2
(45) Date of Patent: May 4, 2021

(54) APPARATUS FOR INSPECTING CHARACTERS/NUMBERS OF NEGOTIABLE INSTRUMENT, AND METHOD FOR INSPECTING CHARACTERS/NUMBERS OF NEGOTIABLE INSTRUMENT

(71) Applicants: GLORY LTD., Himeji (JP); KOMORI CORPORATION, Tokyo (JP)

(72) Inventors: Kazutaka Adachi, Himeji (JP);
Hiroyuki Onishi, Himeji (JP);
Hiromitsu Numauchi, Tsukuba (JP)

(73) Assignees: GLORY LTD., Himeji (JP); KOMORI CORPORATION, Tokyo (JP)

( * ) Notice: Subject to any disclaimer, the term of this patent is extended or adjusted under 35 U.S.C. 154(b) by 54 days.

(21) Appl. No.: 16/315,296

(22) PCT Filed: Jul. 12, 2017

(86) PCT No.: PCT/JP2017/025345
§ 371 (c)(1),
(2) Date: Jan. 4, 2019

(87) PCT Pub. No.: WO2018/012519
PCT Pub. Date: Jan. 18, 2018

(65) Prior Publication Data
US 2019/0311211 A1    Oct. 10, 2019

(30) Foreign Application Priority Data

Jul. 13, 2016 (JP) .............................. JP2016-138496

(51) Int. Cl.
*G06K 9/46* (2006.01)
*B42D 25/29* (2014.01)
(Continued)

(52) U.S. Cl.
CPC .............. *G06K 9/468* (2013.01); *B41F 11/02* (2013.01); *B41F 33/00* (2013.01); *B42D 25/29* (2014.10); *G06K 2209/01* (2013.01)

(58) Field of Classification Search
CPC ...... B41F 33/0036; B41F 33/00; B41F 11/02; B41F 33/009; B41F 33/0081; B41F 33/16;
(Continued)

(56) References Cited

U.S. PATENT DOCUMENTS

2003/0021459 A1* 1/2003 Neri .......................... G07D 7/20
382/135
2004/0112235 A1 6/2004 Hug et al.
(Continued)

FOREIGN PATENT DOCUMENTS

CN    101090821 A    12/2007
CN    102350863 A    2/2012
(Continued)

OTHER PUBLICATIONS

Indian Office Action for Indian Application No. 201917001352, dated Feb. 25, 2020, with English translation.
(Continued)

*Primary Examiner* — Syed Haider
(74) *Attorney, Agent, or Firm* — Birch, Stewart, Kolasch & Birch, LLP

(57) ABSTRACT

An apparatus for inspecting the characters/numbers of a negotiable instrument, the apparatus being provided with: cameras (124) for imaging the character/number sequence (1b) printed on each design on large-size printed matter (1) on which a plurality of designs of the negotiable instrument are printed; and a character/number inspection device (10) for determining the suitability of the characters/numbers printed on each negotiable instrument on the basis of the
(Continued)

image data imaged by the cameras (124), wherein the character/number inspection device (10) determines the suitability of the character/number sequence (1*b*) in a cut segment (1*a*) on the basis of a plurality of determination standards set in accordance with the position of the cut segment (1*a*) on the large-size printed matter (1).

4 Claims, 26 Drawing Sheets

(51) Int. Cl.
*B41F 11/02* (2006.01)
*B41F 33/00* (2006.01)

(58) Field of Classification Search
CPC .. G06K 9/468; G06K 9/3258; G06K 2209/01; B42D 25/29; B41P 2213/91
See application file for complete search history.

(56) References Cited

U.S. PATENT DOCUMENTS

| | | | |
|---|---|---|---|
| 2005/0186002 A1* | 8/2005 | Matsutake | G06K 9/036 400/63 |
| 2005/0199151 A1 | 9/2005 | Holten et al. | |
| 2009/0202134 A1* | 8/2009 | Kano | G06K 9/2054 382/141 |
| 2010/0188671 A1 | 7/2010 | Ihme et al. | |
| 2013/0343652 A1* | 12/2013 | Goto | G06K 9/00442 382/182 |
| 2016/0016744 A1* | 1/2016 | Turke | B65H 33/16 270/52.02 |
| 2017/0039724 A1* | 2/2017 | Yanagiuchi | B41J 29/46 |

FOREIGN PATENT DOCUMENTS

| | | |
|---|---|---|
| DE | 102006015828 A1 | 10/2007 |
| EP | 1607234 A1 | 12/2005 |
| EP | 2902210 A1 | 8/2015 |
| JP | 2005-274950 A | 10/2005 |
| JP | 2007-81896 A | 3/2007 |
| JP | 2008-118445 A | 5/2008 |
| JP | 2009-47568 A | 3/2009 |
| JP | 2014-198480 A | 10/2014 |
| JP | 2015-85647 A | 5/2015 |
| JP | 2015-211404 A | 11/2015 |
| JP | 2016-511715 A | 4/2016 |
| WO | WO 02/083423 A1 | 10/2002 |
| WO | WO 2005/087494 A1 | 9/2005 |
| WO | WO 2006/051563 A1 | 5/2006 |
| WO | WO 2014/132206 A1 | 9/2014 |
| WO | WO-2014132206 A1 * | 9/2014 ............ B65H 39/02 |
| WO | WO 2015/159941 A1 | 10/2015 |
| WO | WO-2015159941 A1 * | 10/2015 ........... G01N 21/892 |

OTHER PUBLICATIONS

Office Action dated Apr. 15, 2020 in counterpart Chinese Patent Application No. 201780041390.9 with an English Translation.
Office Action dated Jun. 23, 2020 in counterpart Japanese Patent Application No. 2016-138496.
Japanese Office Action dated Feb. 16, 2021 in counterpart Japanese Patent Aplication No. 2016-138496.

* cited by examiner

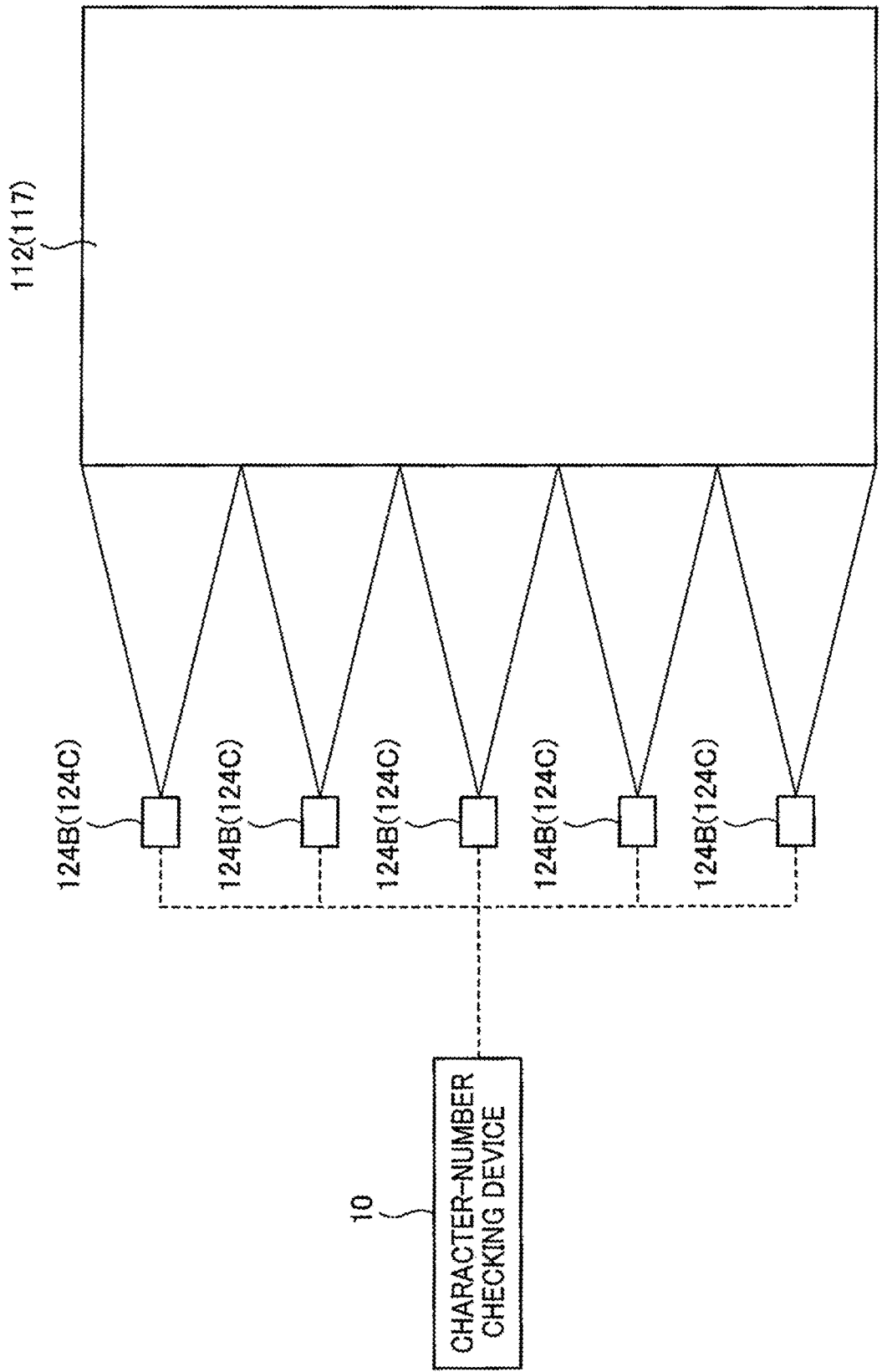

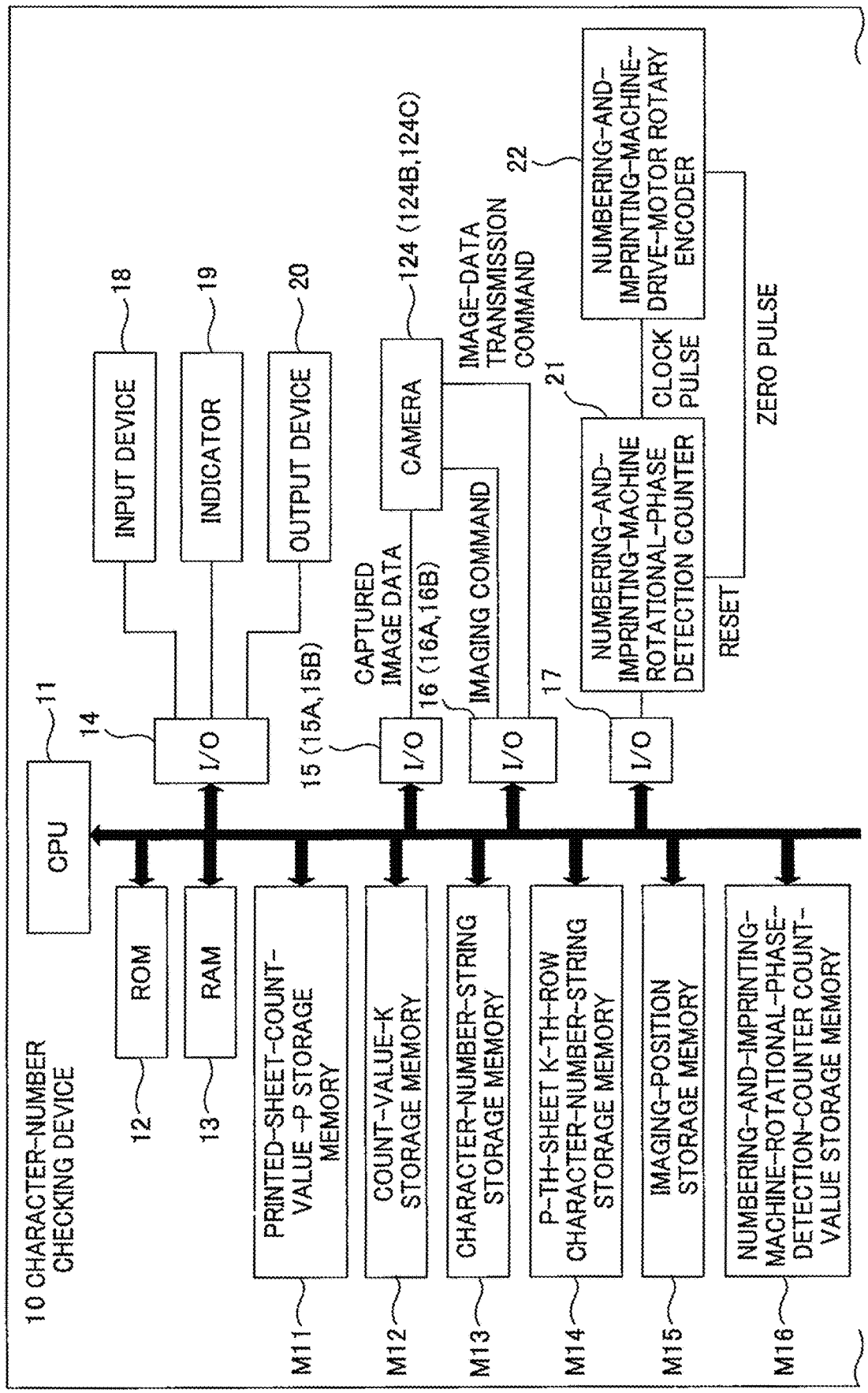

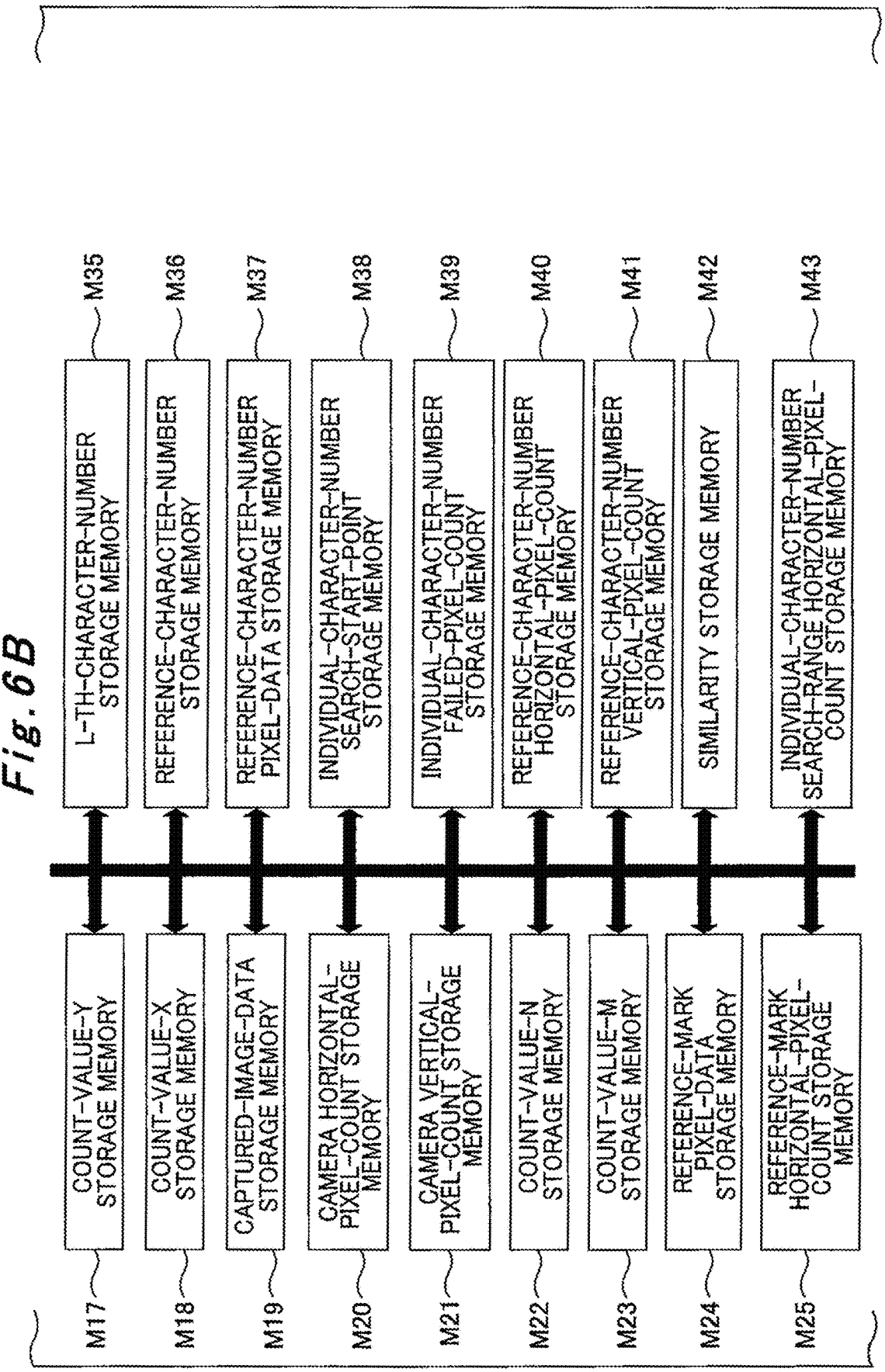

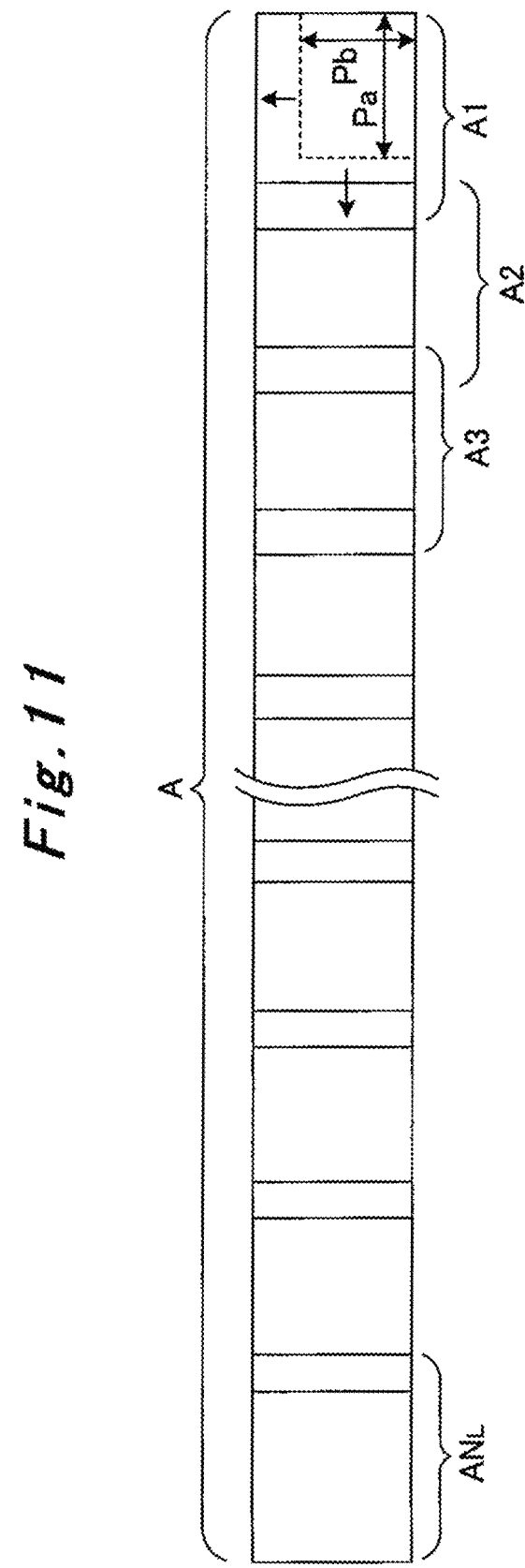

APPARATUS FOR INSPECTING CHARACTERS/NUMBERS OF NEGOTIABLE INSTRUMENT, AND METHOD FOR INSPECTING CHARACTERS/NUMBERS OF NEGOTIABLE INSTRUMENT

TECHNICAL FIELD

The present invention relates to a securities character-number checking apparatus and a securities character-number checking method.

BACKGROUND ART

Printed securities products such as bank notes (hereinafter, referred to as securities) are obtained by simultaneously printing a plurality of securities patterns on a single printing sheet (large-size printing product) in a layout of six rows by five columns or the like by what is called step and repeat imposition printing, and further by printing characters and numbers for management during production (serial number: e.g. a combination of alphabetical letters and Arabic numerals) on each pattern by means of a numbering and imprinting machine. Hereinafter, a pattern with characters and numbers printed thereon will be referred to as a small piece.

The printed characters and numbers are checked by a number checking apparatus as for whether the characters and numbers are printed so accurately that they look natural when a person sees them, whether the characters and numbers are printed at an accurate position relative to a reference mark (=reference mark), whether the characters and numbers are printed in a proper sequential order so that they can be easily managed, and so on. Thereafter, the large-size printing product is cut into small pieces and used as securities.

A numbering and imprinting machine described in, for example, Patent Document 1 has heretofore been known as a numbering and imprinting machine equipped with a number checking apparatus as mentioned above.

PRIOR ART DOCUMENT

Patent Document

Patent Document 1: Japanese Patent Application Publication No. 2015-85647

SUMMARY OF THE INVENTION

Problem to be Solved by the Invention

Here, conventional number checking apparatuses check sets of characters and numbers by using the same criterion.

Note that when securities patterns are printed on a large-size printing product, the printing is performed by applying pressure. As a result, the phenomenon called fan out occurs, in which the patterns on the trailing edge side are stretched in the shape of a fan. Then, if characters and numbers are printed by a numbering and imprinting machine on a large-size printing product with the patterns on the trailing edge side stretched as above, the printed positions of the character-number strings relative to their respective reference marks will be different between a region where the patterns are stretched and a region where the patterns are not stretched, even though they are on a single large-size printing product. Thus, if the same criterion for judgment is used in checking of the printed positions of sets of characters and numbers relative to their respective reference marks on a single large-size printing product, there is a possibility of making a wrong judgment that the printed positions of the sets of characters and numbers relative to their respective reference marks on the trailing edge side are outside a preset allowable range and that a printing failure has occurred, due to the printing of the set of characters and numbers on the stretched patterns, even though the set of character and numbers are printed accurately (printed so accurately that they look natural when a person sees them).

In view of the above, an object of the present invention is to provide a securities character-number checking apparatus and a securities character-number checking method capable of accurately checking characters and numbers even in a case where some of patterns on the printing sheet are stretched.

Means for Solving the Problem

A securities character-number checking apparatus according to a first aspect of the invention for solving the above problem includes
 an imaging device that images serial numbers printed on a plurality of securities printed on a printing sheet, and
 a character-number checking unit that judges whether or not the serial numbers printed on the securities are acceptable based on image data captured by the imaging device,
 the securities character-number checking apparatus characterized in that
 the character-number checking unit judges whether or not the serial numbers printed on the securities have been printed properly, based on a plurality of criteria for judgment set in accordance with positions of the securities on the printing sheet.

Also, a securities character-number checking apparatus according to a second aspect of the invention for solving the above problem is characterized in that
 the character-number checking unit judges whether or not printing quality of components of the serial numbers and positions of the serial numbers are proper quality and proper positions,
 a same criterion is set for all of the securities for judging the printing quality of the components of the serial numbers, and
 a plurality of criteria are set for judging the positions of the serial numbers, in accordance with the positions of the respective securities on the printing sheet.

Also, a securities character-number checking method according to a third aspect of the invention for solving the above problem includes
 imaging serial numbers printed on a plurality of securities printed on a printing sheet, and
 judging whether or not the serial numbers printed on the securities have been printed properly, based on captured image data,
 the securities character-number checking method characterized in that the securities character-number checking method comprises
 judging whether or not the serial numbers printed on the securities have been printed properly, based on a plurality of criteria for judgment set in accordance with positions of the securities on the printing sheet.

Also, a securities character-number checking method according to a fourth aspect of the invention for solving the above problem is characterized in that the securities character-number checking method further comprises:

setting a same criterion for all of the securities for judging printing quality of components of the serial numbers; and setting a plurality of criteria for judging positions of the serial numbers, in accordance with the positions of the respective securities on the printing sheet.

Effect of the Invention

With a securities character-number checking apparatus and a securities character-number checking method according to the present invention, it is possible to accurately check characters and numbers in a case where some of patterns on the printing sheet are stretched.

BRIEF DESCRIPTION OF THE DRAWINGS

FIG. 5 is an explanatory diagram illustrating an example of the arrangement of number checking cameras.

FIG. 6A is a block diagram illustrating the configuration of a printing-press control device according to an embodiment of the present invention.

FIG. 6B is a block diagram illustrating the configuration of the printing-press control device according to the embodiment of the present invention.

FIG. 11 is an explanatory diagram illustrating character-number search ranges.

MODES FOR CARRYING OUT THE INVENTION

An embodiment of a securities character-number checking apparatus and a securities character-number checking method according to the present invention will be described based on the drawings. However, the present invention is not limited only to the following embodiment to be described based on the drawings.

A main embodiment of a combined printing press combining a numbering and imprinting machine equipped with the securities character-number checking apparatus according to this embodiment and a coating machine will be described based on FIGS. 1 to 11.

Figure 1:
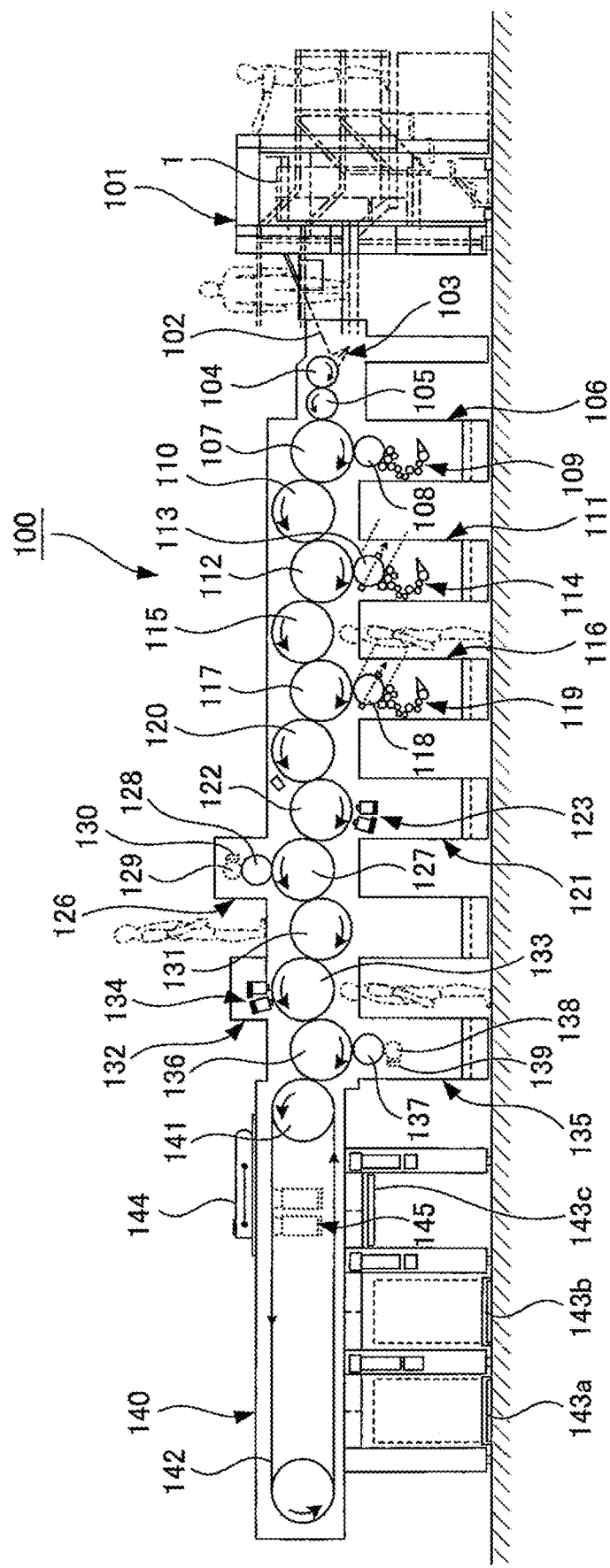
FIG. 1 is a schematic overall configuration view of a main embodiment of a combined printing press combining a numbering and imprinting machine equipped with a securities character-number checking apparatus according to the present invention and a coating machine.

As illustrated in FIG. 1, on the forward edge side of a feeder board 102 of a sheet feeder 101 that individually feeds large-size printing products (printing sheets) 1, which are products to be printed, a transfer cylinder 104 that transports a large-size printing product 1 while gripping its forward edge with a gripper device (not illustrated) is arranged with a swing arm shaft pregripper 103 therebetween. A transfer cylinder 105 that transports a large-size printing product 1 while gripping its forward edge with a gripper device (not illustrated) is in contact with this transfer cylinder 104. The swing arm shaft pregripper 103 can individually pass large-size printing products 1 from the feeder board 102 to the transfer cylinder 105 through the transfer cylinder 104.

An impression cylinder 107, which is a double-size cylinder, is in contact with the transfer cylinder 105, the impression cylinder 107 being a seal impression cylinder that is situated downstream of the contacting portion of the transfer cylinder 105 with the transfer cylinder 104 in the direction of rotation and that transports a large-size printing product 1 while gripping its forward edge with a gripper device (not illustrated). A seal cylinder 108 is in contact with a lower portion of this impression cylinder 107, the seal cylinder 108 being a single cylinder (single-size cylinder) that performs seal printing on the large-size printing product 1 held on the impression cylinder 107. This seal cylinder 108 is supported to be movable to come into contact (engage) with and separate (disengage) from the impression cylinder 107. On the lower side of this seal cylinder 108 is provided an inking device 109 being ink feeding means for feeding ink to the seal cylinder 108. In this embodiment, components such as these impression cylinder 107, seal cylinder 108, and inking device 109 constitute a seal printing unit 106 being seal printing means.

A transport cylinder 110 is in contact with the impression cylinder 107, the transport cylinder 110 being a cylinder that is situated downstream of the contacting portion of the impression cylinder 107 with the seal cylinder 108 (seal printing position) in the direction of rotation and that transports a large-size printing product 1 while gripping its forward edge with a gripper device (not illustrated). An impression cylinder 112 being a double-size cylinder is in contact with this transport cylinder 110, the impression cylinder 112 being a first-number impression cylinder that is situated downstream of the contacting portion of the transport cylinder 110 with the impression cylinder 107 in the sheet transport direction and that transports a large-size printing product 1 while gripping its forward edge with a gripper device (not illustrated). A first-number cylinder 113 being a first-number cylinder is in contact with a lower portion of this impression cylinder 112, the first-number cylinder 113 being a single cylinder (single-size cylinder) that performs first-number printing on the large-size printing product 1 held on the impression cylinder 112. This first-number cylinder 113 is supported to be movable to come into contact (engage) with and separate (disengage) from the impression cylinder 112. On the lower side of this first-number cylinder 113 is provided an inking device 114 being ink feeding means for feeding ink to the first-number cylinder 113. In this embodiment, components such as these impression cylinder 112, first-number cylinder 113, and inking device 114 constitute a first-number printing unit 111 being first-number printing means.

A transport cylinder 115 is in contact with the impression cylinder 112, the transport cylinder 115 being a cylinder that is situated downstream of the contacting portion of the impression cylinder 112 with the first-number cylinder 113 (first-number printing position) in the direction of rotation and that transports a large-size printing product 1 while gripping its forward edge with a gripper device (not illustrated). An impression cylinder 117 being a double-size cylinder is in contact with this transport cylinder 115, the impression cylinder 117 being a second-number impression cylinder that is situated downstream of the contacting portion of the transport cylinder 115 with the impression cylinder 112 in the sheet transport direction and that transports a large-size printing product 1 while gripping its forward edge with a gripper device (not illustrated). A second-number cylinder 118 being a second-number cylinder is in contact with a lower portion of this impression cylinder 117, the second-number cylinder 118 being a single cylinder (single-size cylinder) that performs second-number printing on the large-size printing product 1 held on the impression cylinder 117. This second-number cylinder 118 is supported to be movable to come into contact (engage) with and separate (disengage) from the impression cylinder 117. On the lower side of this second-number cylinder 118 is provided an inking device 119 being ink feeding means for feeding ink to the number cylinder 118. In this embodiment, components such as these impression cylinder 117, second-number cylinder 118, and inking device 119 constitute a second-number printing unit 116 being second-number printing means.

A transport cylinder 120 is in contact with the impression cylinder 117, the transport cylinder 120 being a cylinder that is situated downstream of the contacting portion of the impression cylinder 117 with the second-number cylinder 118 (second-number printing position) in the direction of rotation and that transports a large-size printing product 1 while gripping its forward edge with a gripper device (not illustrated). An impression cylinder 122 is in contact with this transport cylinder 120, the impression cylinder 122 being a cylinder that is situated downstream of the position of contact of the transport cylinder 120 with the impression cylinder 117 in the sheet transport direction and that transports a large-size printing product 1 while gripping its forward edge with a gripper device (not illustrated). Under this transport cylinder 122 are provided two drying lamps 123 facing the peripheral surface of the transport cylinder 122. In this embodiment, components such as these transport cylinder 122 and drying lamps 123 constitute a first drying unit 121 being first drying means.

An impression cylinder 127 is in contact with the transport cylinder 122, the impression cylinder 127 being a double-size cylinder that is situated downstream of the position where the drying lamps 123 face the transport cylinder 122 in the sheet transport direction and that transports a large-size printing product 1 while gripping its forward edge with a gripper device (not illustrated). An other-surface coating cylinder 128 is in contact with an upper portion of this impression cylinder 127, the other-surface coating cylinder 128 being a single cylinder (single-size cylinder) that performs coating on the other surface of the large-size printing product 1 held on the impression cylinder 127. This other-surface coating cylinder 128 is supported to be movable to come into contact (engage) with and separate (disengage) from the impression cylinder 127. On the upper side of and above this other-surface coating cylinder 128 are provided an anilox roller 129 and a chamber coater 130 that feed a coating liquid such as varnish onto the plate surface of a resin plate of the other-surface coating cylinder 128. In this embodiment, components such as these impression cylinder 127, other-surface coating cylinder 128, anilox roller 129, and chamber coater 130 constitute an other-surface coating unit 126 being other-surface coating means.

A transport cylinder 131 is in contact with the impression cylinder 127, the transport cylinder 131 being a cylinder that is situated downstream of the contacting portion of the impression cylinder 127 with the other-surface coating cylinder 128 (other-surface coating position) in the direction of rotation and that transports a large-size printing product 1 while gripping its forward edge with a gripper device (not illustrated). A transport cylinder 133 is in contact with this transport cylinder 131, the transport cylinder 133 being a cylinder that is situated downstream of the contacting portion of the transport cylinder 131 with the impression cylinder 127 in the sheet transport direction and that transports a large-size printing product 1 while gripping its forward edge with a gripper device (not illustrated). Above this transport cylinder 133 are provided two drying lamps 134 facing the peripheral surface of the transport cylinder 133. Components such as these transport cylinder 133 and drying lamps 134 constitute a second drying unit 132 being second drying means.

An impression cylinder 136 is in contact with the transport cylinder 133, the impression cylinder 136 being a double-size cylinder that is situated downstream of the position where the drying lamps 134 face the transport cylinder 133 in the sheet transport direction and that transports a large-size printing product 1 while gripping its forward edge with a gripper device (not illustrated). A one-surface coating cylinder 137 is in contact with a lower portion of this impression cylinder 136, the one-surface coating cylinder 137 being a single cylinder (single-size cylinder) that performs coating on one surface of the large-size printing product 1 held on the impression cylinder 136. This one-surface coating cylinder 137 is supported to be movable to come into contact (engage) with and separate (disengage) from the impression cylinder 136. On the lower side of and under this one-surface coating cylinder 137 are provided an anilox roller 138 and a chamber coater 139 that feed varnish onto the plate surface of a resin plate of the one-surface coating cylinder 137. Components such as these impression cylinder 136, one-surface coating cylinder 137, anilox roller 138, and chamber coater 139 constitute a one-surface coating unit 135 being one-surface coating means.

A delivery cylinder 141 is in contact with the impression cylinder 136, the delivery cylinder 141 being a cylinder that is situated downstream of the contacting portion of the impression cylinder 136 with the one-surface coating cylinder 137 (one-surface coating position) in the direction of rotation. This delivery cylinder 141 is coaxially provided with a sprocket not illustrated, and an endless transport chain 142 provided with a plurality of gripper bars is wound thereon. Under the transport chain 142 are installed a plurality of pile boards on which to pile large-size printing products 1 (in the illustrated example, three pile boards including two pile boards 143*a*, 143*b* for good sheets and one pile board 143*c* for bad sheets) along the direction of travel of the transport chain 142. In this embodiment, components such as these delivery cylinder 141, transport chain 142, and pile boards 143*a* to 143*c* constitute a delivery unit 140 being sheet delivering means.

Moreover, a suction guide 144 is installed above an upper travelling chain portion of the transport chain 142, whereas two drying lamps 145 being third drying means are installed therebelow opposite the suction guide 144.

Figure 2:
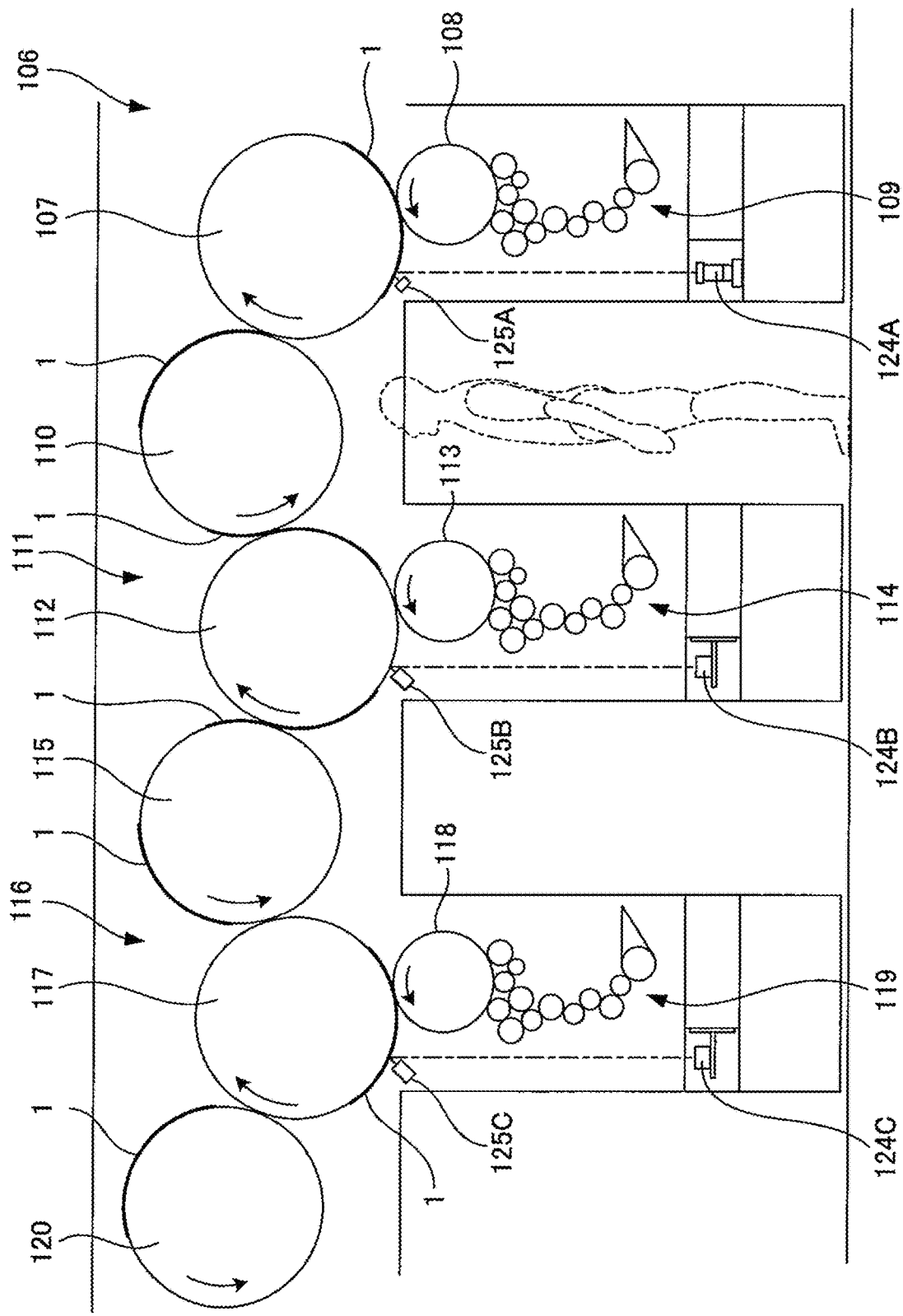
FIG. 2 is a partially enlarged view of a main part of FIG. 1.

Also, as illustrated in FIG. 2, a seal checking camera 124A that images seals printed on a large-size printing product 1 held on the impression cylinder 107 is arranged below the impression cylinder 107 at a position near the contacting portion between the impression cylinder 107 and the seal cylinder 108 of the seal printing unit 106 (seal printing position) which is downstream of the contacting portion between the impression cylinder 107 and the seal cylinder 108 (seal printing position) in the direction of rotation of the impression cylinder 107 but upstream of the contacting portion between the impression cylinder 107 and the transport cylinder 110 in the direction of rotation of the impression cylinder 107. A lighting device 125A is arranged near the contacting portion between the impression cylinder 107 and the seal cylinder 108 (seal printing position) and downstream thereof in the direction of rotation of the impression cylinder 107. This lighting device 125A is set up to be capable of illuminating an imaging position on the large-size printing product 1 to be imaged by the seal checking camera 124A.

First-number checking cameras 124B that image first numbers printed on a large-size printing product 1 held on the impression cylinder 112 are arranged below the impression cylinder 112 at a position near the contacting portion between the impression cylinder 112 and the first-number cylinder 113 of the first-number printing unit 111 (first-number printing position) which is downstream of the contacting portion between the impression cylinder 112 and the first-number cylinder 113 (first-number printing position) in the direction of rotation of the impression cylinder 112 but upstream of the contacting portion between the impression cylinder 112 and the transport cylinder 115 in the direction of rotation of the impression cylinder 112. A lighting device 125B is arranged near the contacting portion between the impression cylinder 112 and the first-number cylinder 113 (first-number printing position) and downstream thereof in the direction of rotation of the impression cylinder 112. This lighting device 125B is set up to be capable of illuminating imaging positions on the large-size printing product 1 to be imaged by the first-number checking cameras 124B.

Second-number checking cameras 124C that image second numbers printed on a large-size printing product 1 held on the impression cylinder 117 are arranged below the impression cylinder 117 at a position near the contacting portion between the impression cylinder 117 and the second-number cylinder 118 of the second-number printing unit 116 (second-number printing position) which is downstream of the contacting portion between the impression cylinder 117 and the second-number cylinder 118 (second-number printing position) in the direction of rotation of the impression cylinder 117 but upstream of the contacting portion between the impression cylinder 117 and the transport cylinder 120 in the direction of rotation of the impression cylinder 117. A lighting device 125C is arranged near the contacting portion between the impression cylinder 117 and the second-number cylinder 118 (second-number printing position) and downstream thereof in the direction of rotation of the impression cylinder 117. This lighting device 125C is set up to be capable of illuminating imaging positions on the large-size printing product 1 to be imaged by the second-number checking cameras 124C.

Figure 3:
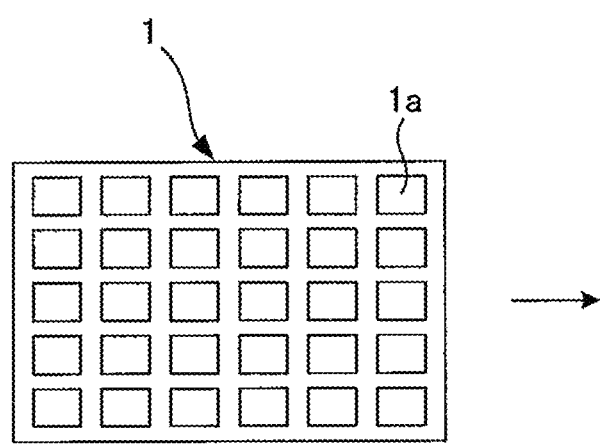
FIG. 3 is a plan view illustrating an example of a paper sheet after step and repeat imposition printing.

Here, as illustrated in FIG. 3, many securities patterns have been printed in advance on each large-size printing product 1 by a printing press (e.g. offset rotary printing press), and a seal and first and second numbers are printed on each of these patterns by the seal printing unit 106, the first-number printing unit 111, and the second-number printing unit 116, respectively. In the example illustrated in FIG. 3, six rows of small pieces 1*a* are printed in the longitudinal direction (direction along the direction of advance) and five columns of small pieces 1*a* are printed in the transverse direction (direction perpendicular to the direction of advance), each small piece 1*a* having characters and numbers printed on its pattern.

Figure 4:
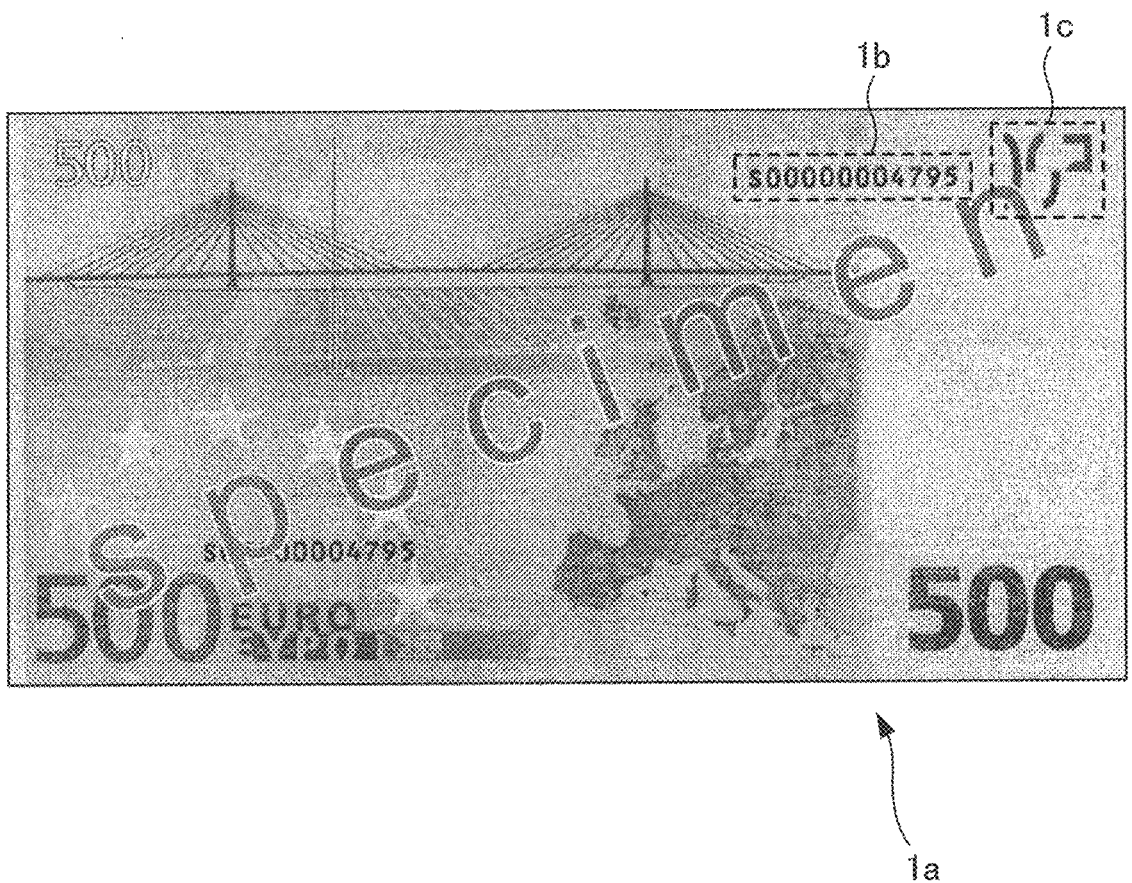
FIG. 4 is an explanatory view illustrating an example of a security.

Also, FIG. 4 illustrates an example of a character-number string and a reference mark. In FIG. 4, reference sign 1*b* denotes the character-number string and reference sign 1*c* denotes the reference mark.

As illustrated in FIG. 5, as many first and second-number checking cameras 124B, 124C as the number of columns of small pieces 1*a* (five cameras in the example illustrated in FIG. 5) are disposed along the axial direction of the respective impression cylinders 112, 117. Pieces of data of images obtained by these first and second-number checking cameras 124B, 124C are sent to a character-number checking device 10.

Figure 6C:
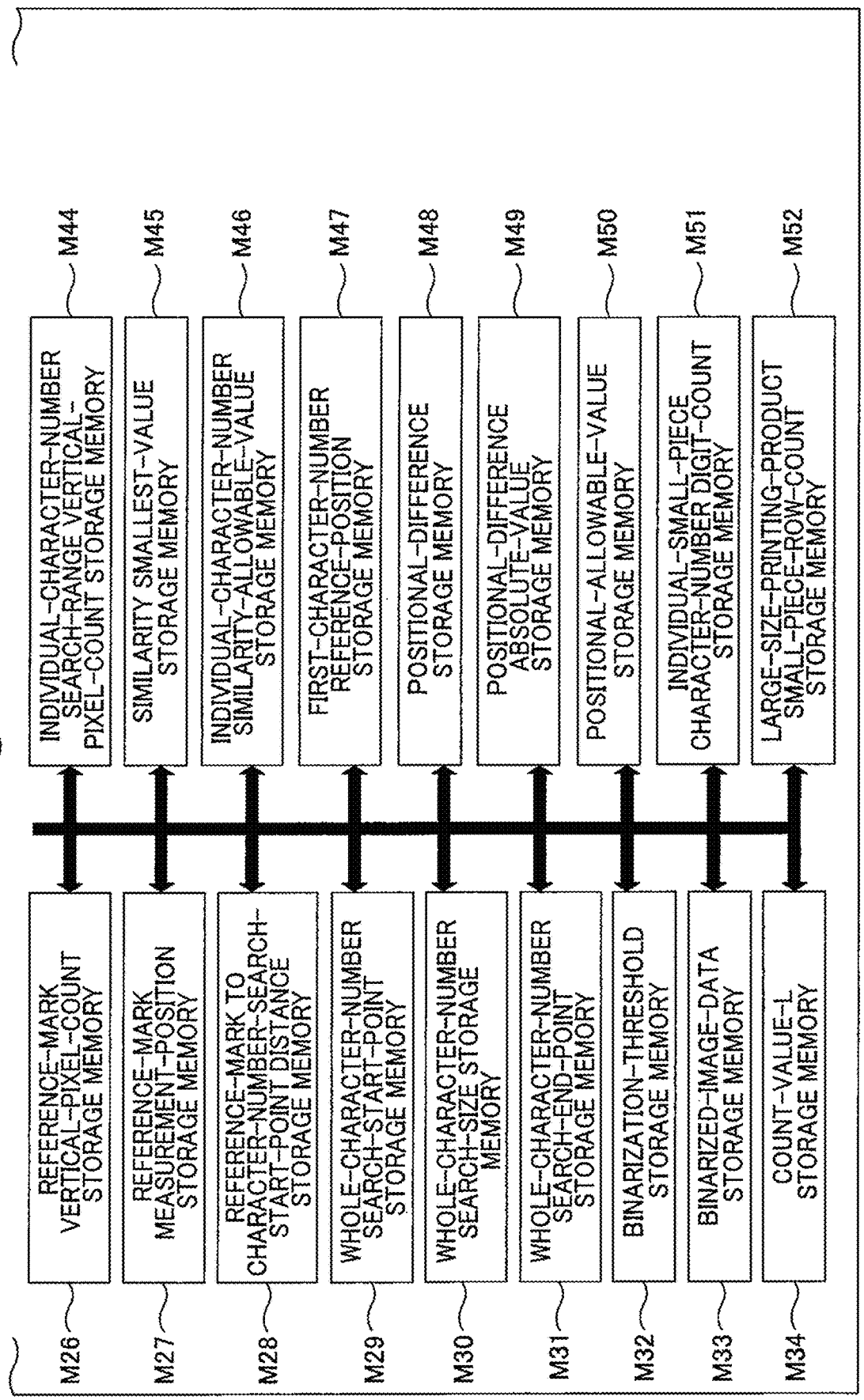
FIG. 6C is a block diagram illustrating the configuration of the printing-press control device according to the embodiment of the present invention.
Figure 7A:
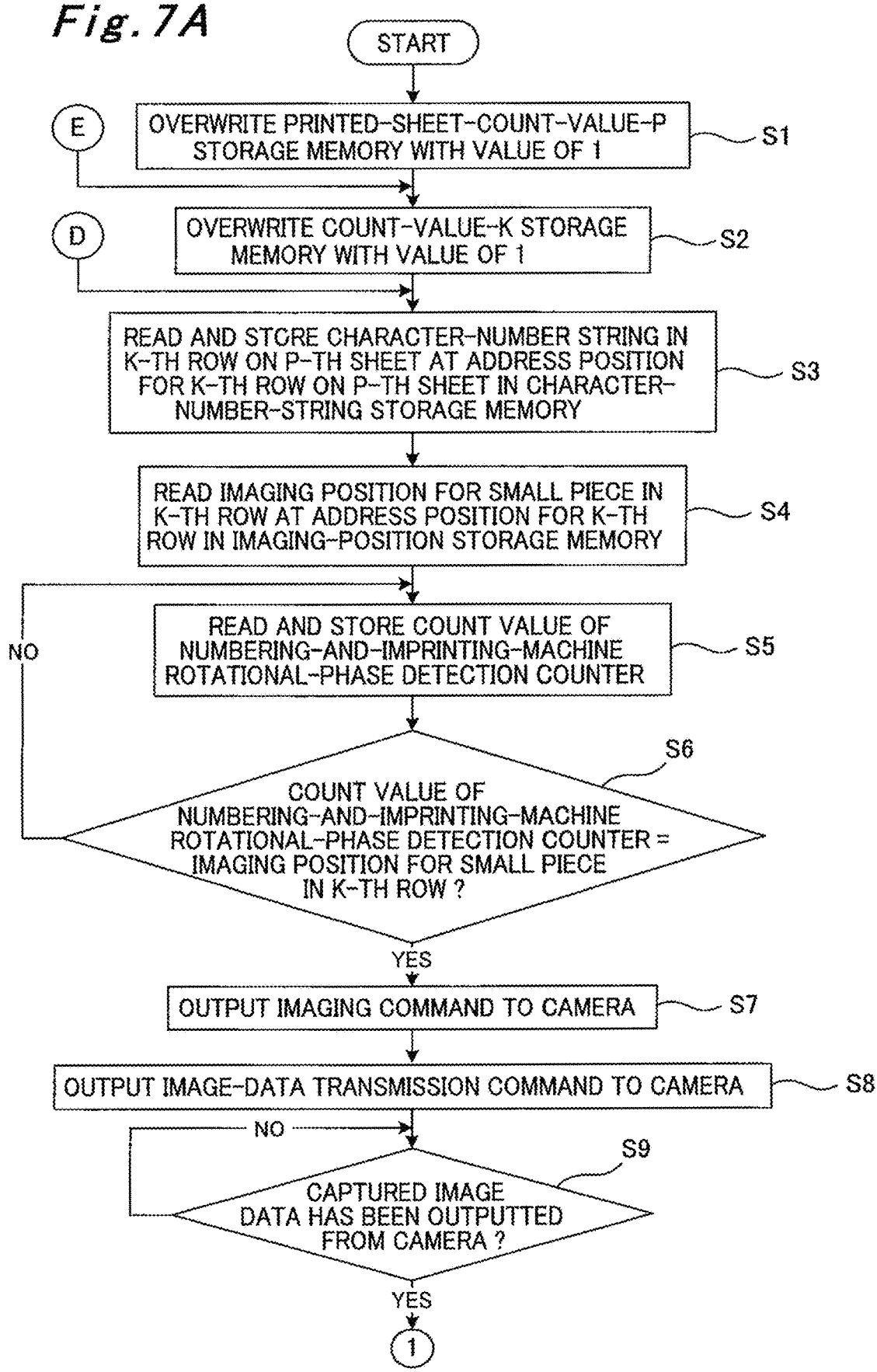
FIG. 7A is a flowchart illustrating the operation of the printing-press control device according to the embodiment of the present invention.
Figure 7B:
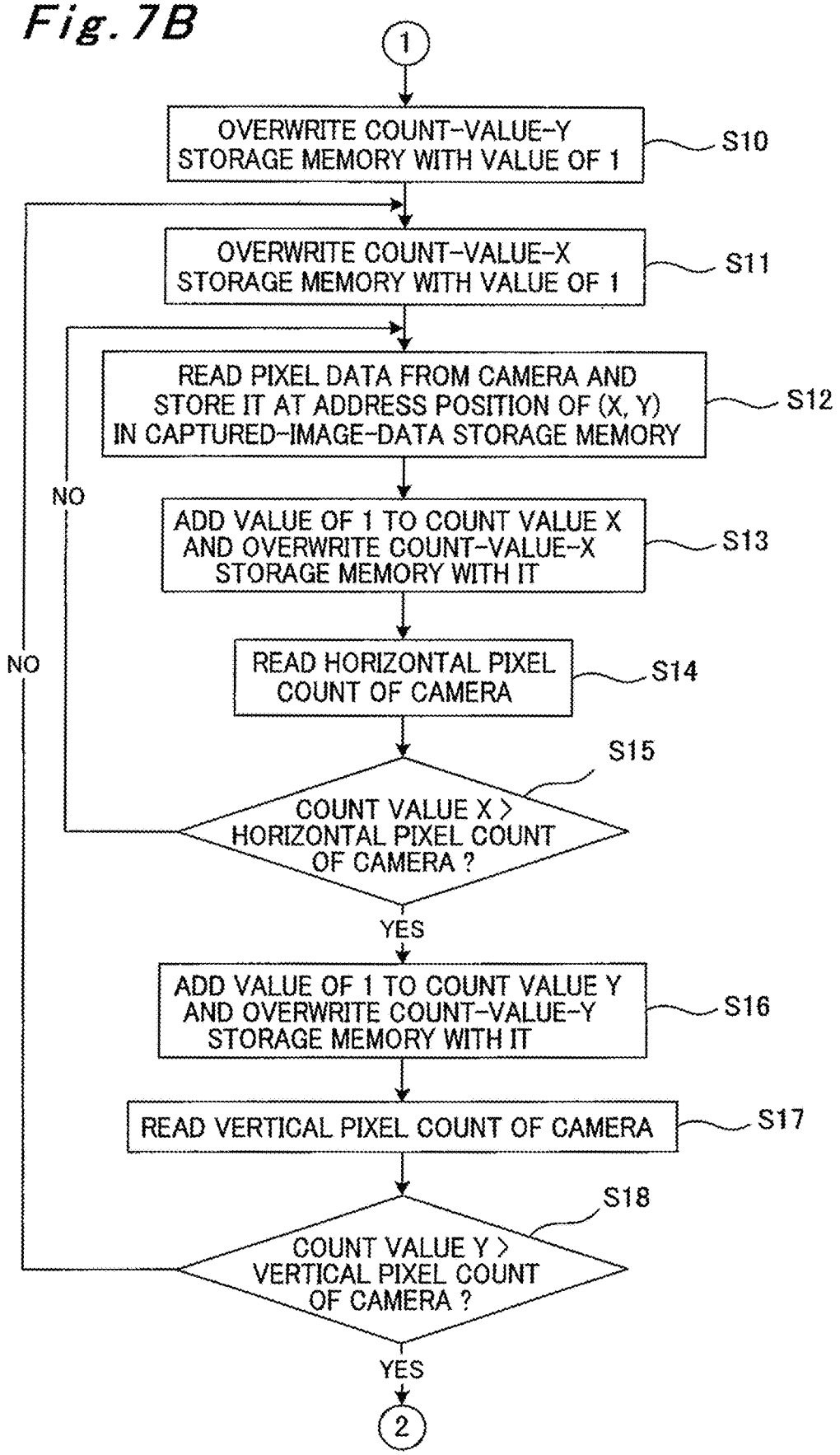
FIG. 7B is a flowchart illustrating the operation of the printing-press control device according to the embodiment of the present invention.
Figure 7C:
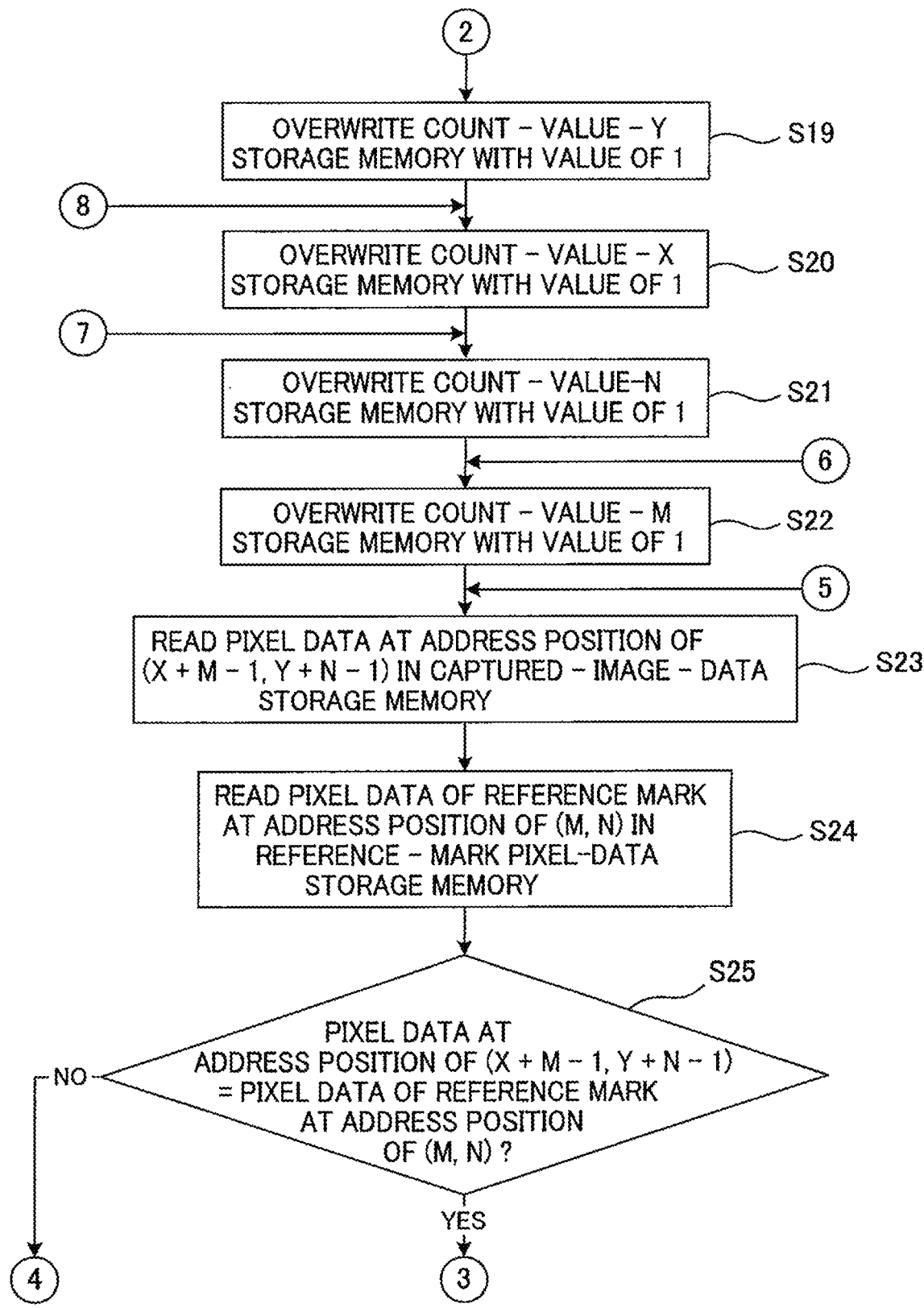
FIG. 7C is a flowchart illustrating the operation of the printing-press control device according to the embodiment of the present invention.
Figure 7D:
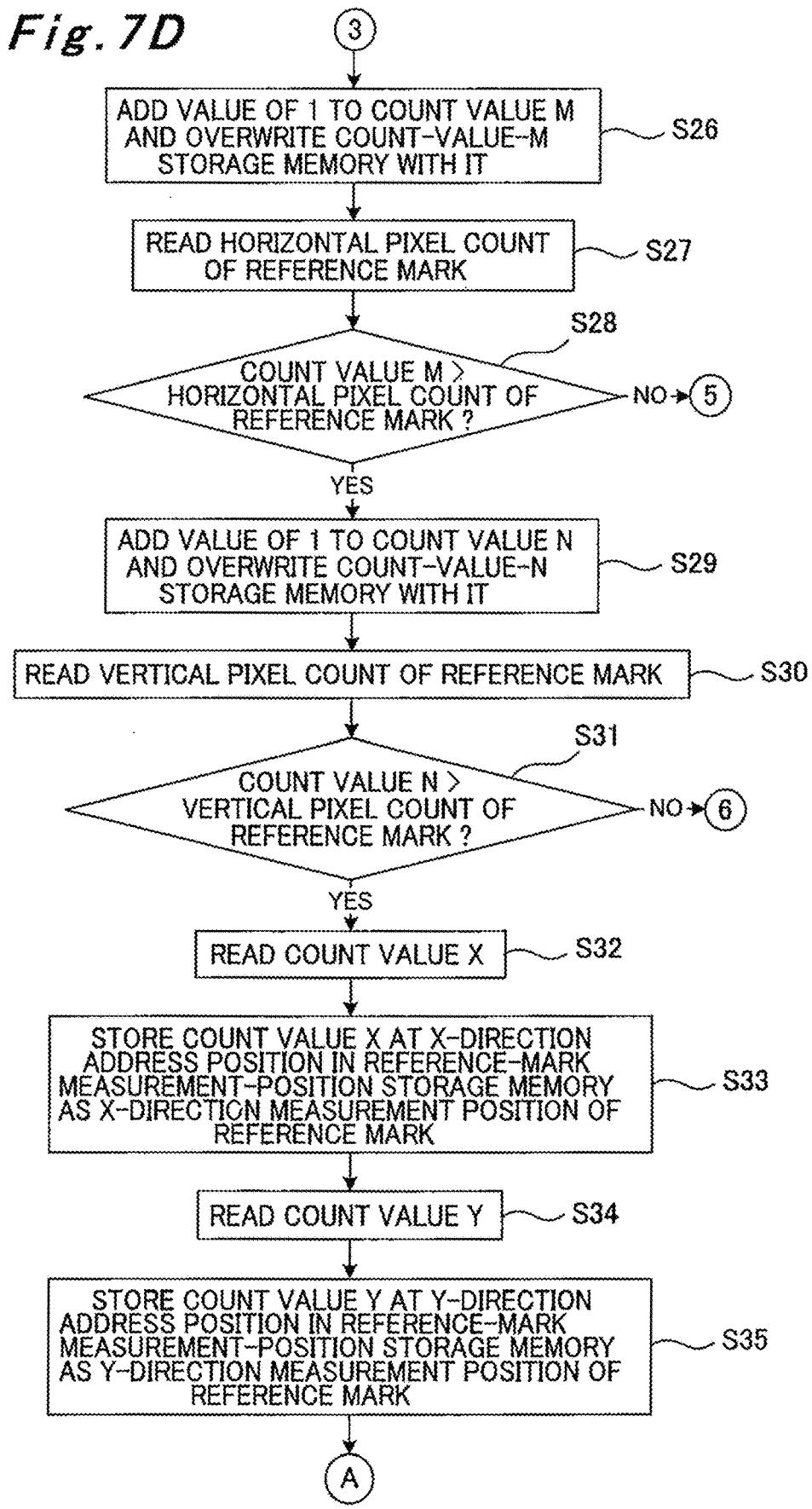
FIG. 7D is a flowchart illustrating the operation of the printing-press control device according to the embodiment of the present invention.
Figure 7E:
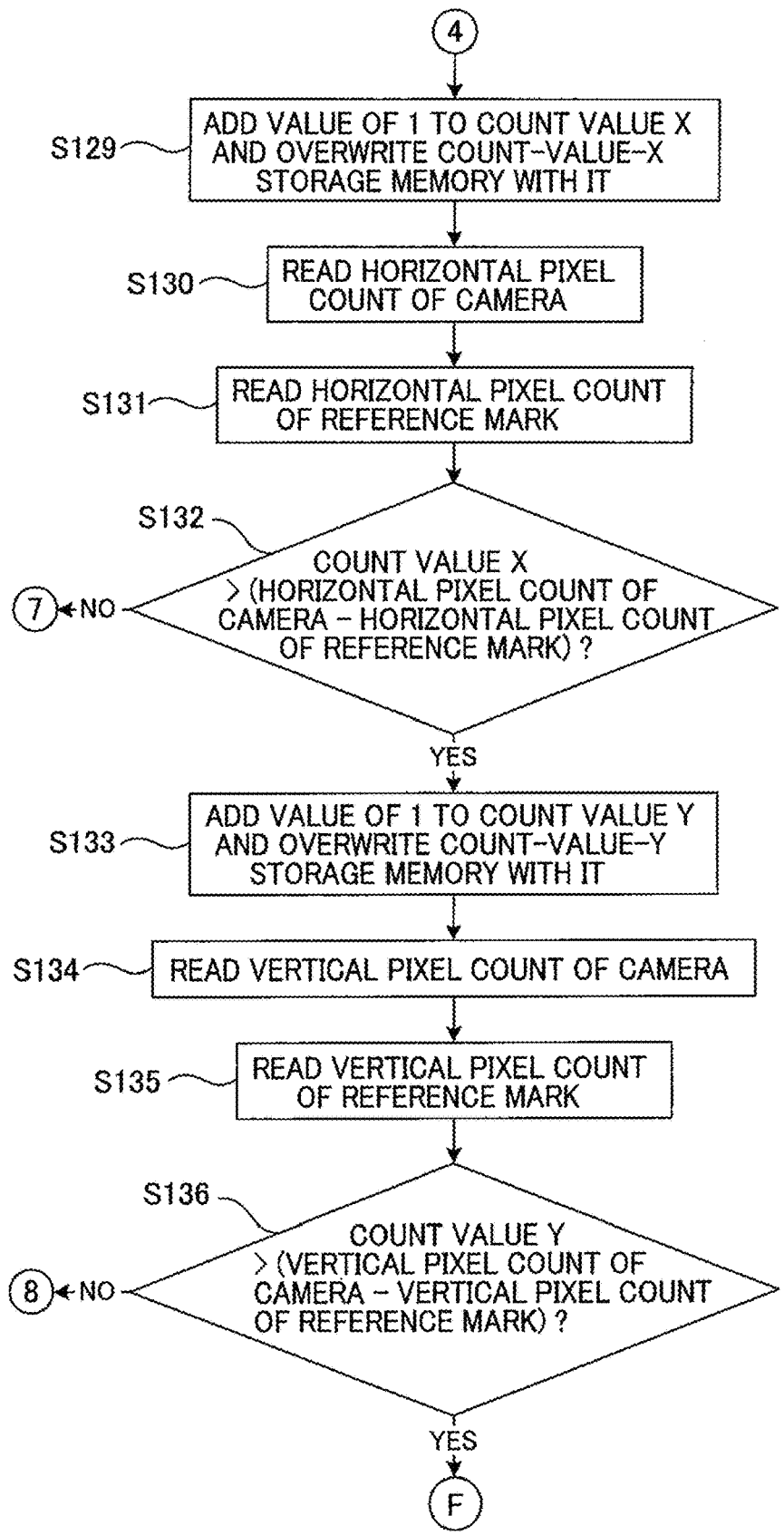
FIG. 7E is a flowchart illustrating the operation of the printing-press control device according to the embodiment of the present invention.
Figure 8A:
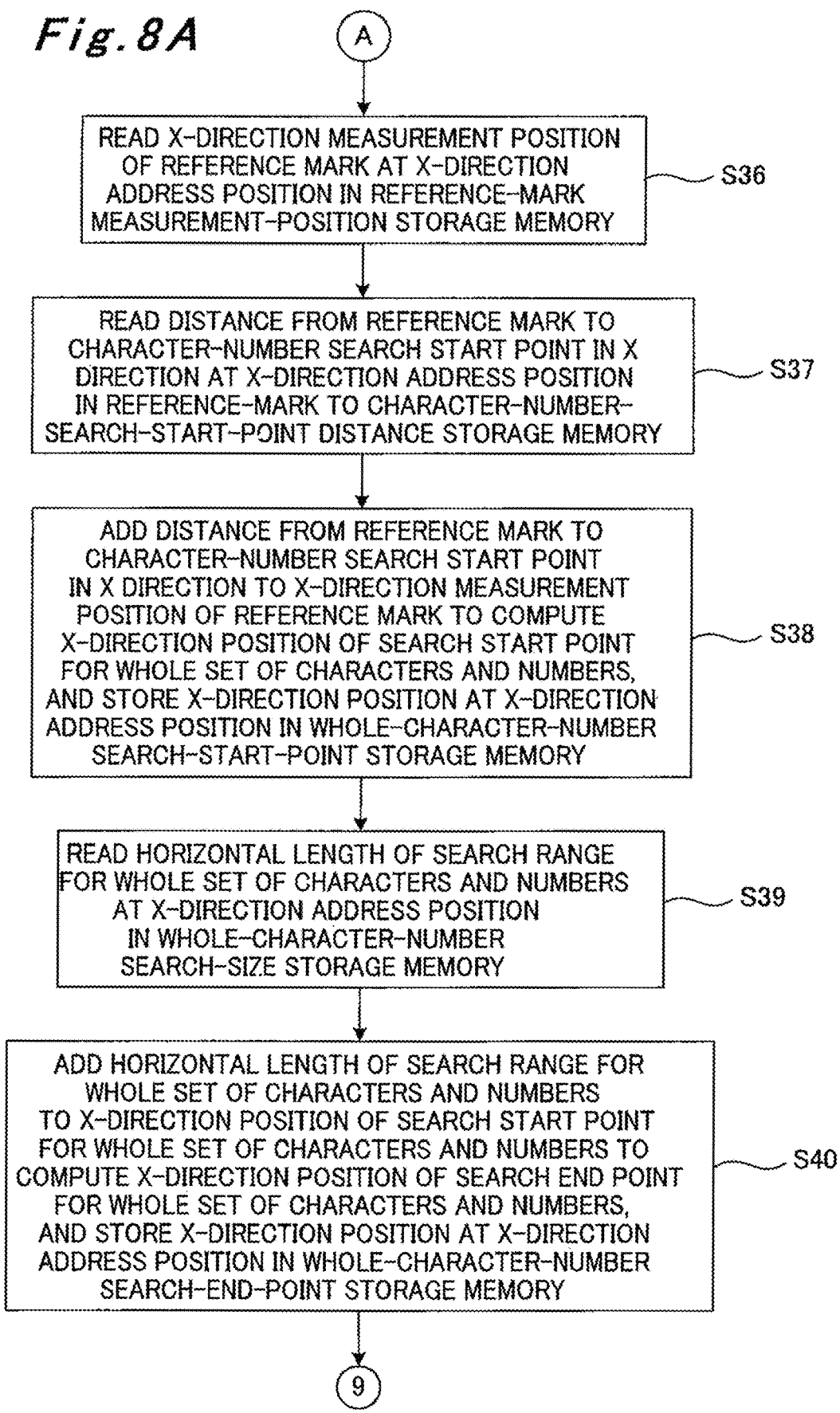
FIG. 8A is a flowchart illustrating the operation of the printing-press control device according to the embodiment of the present invention.
Figure 8B:
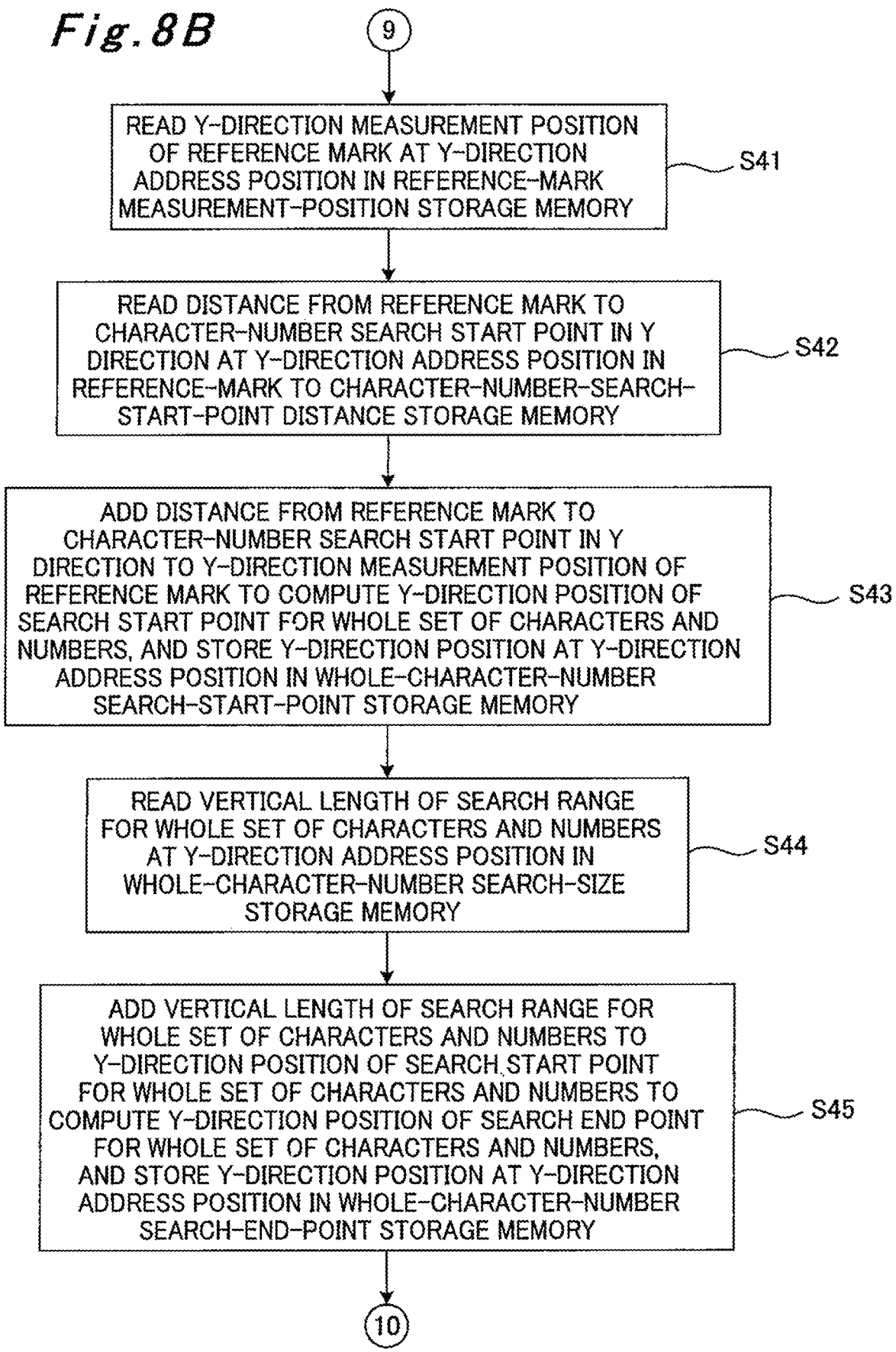
FIG. 8B is a flowchart illustrating the operation of the printing-press control device according to the embodiment of the present invention.
Figure 8C:
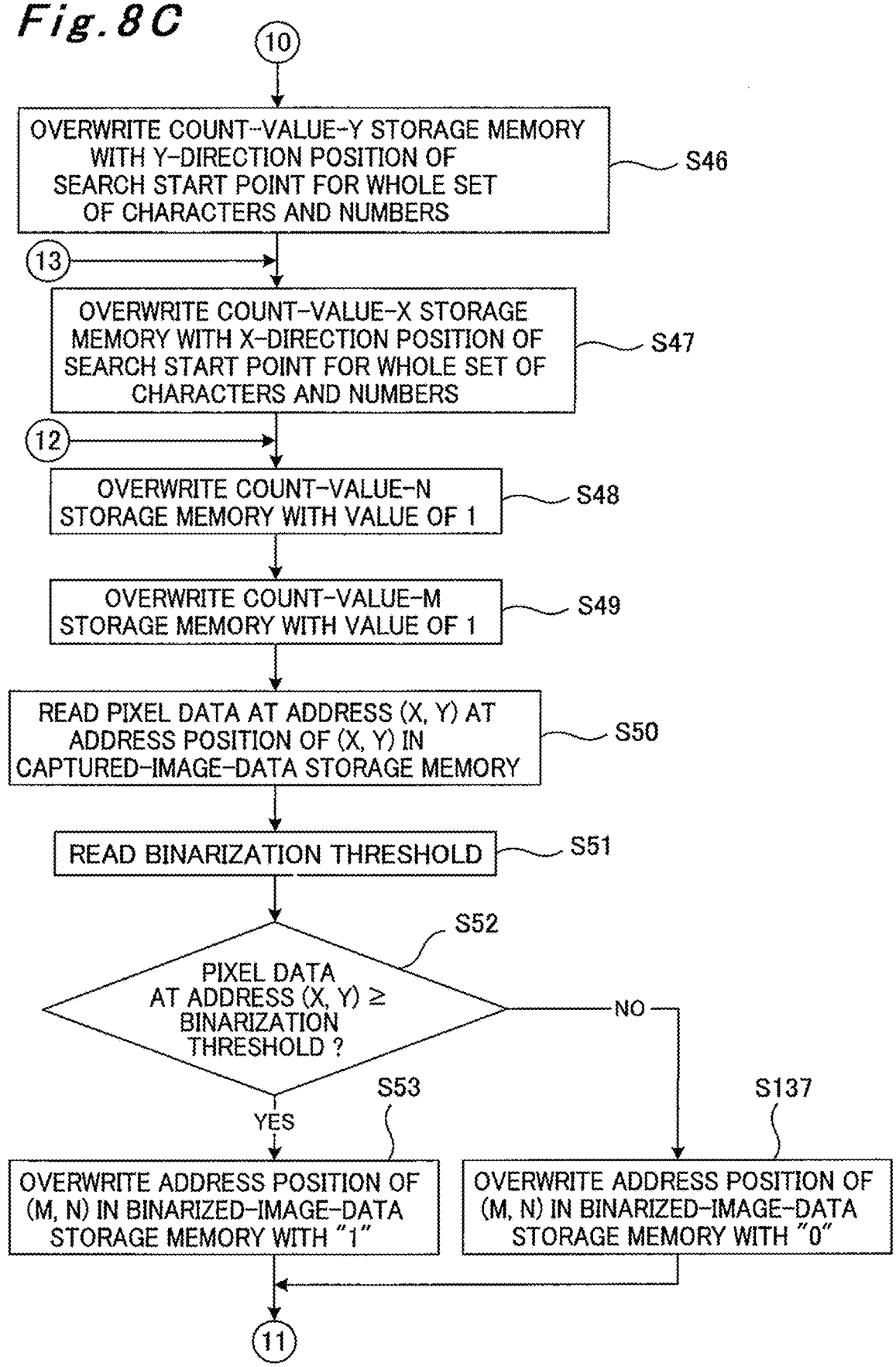
FIG. 8C is a flowchart illustrating the operation of the printing-press control device according to the embodiment of the present invention.
Figure 8D:
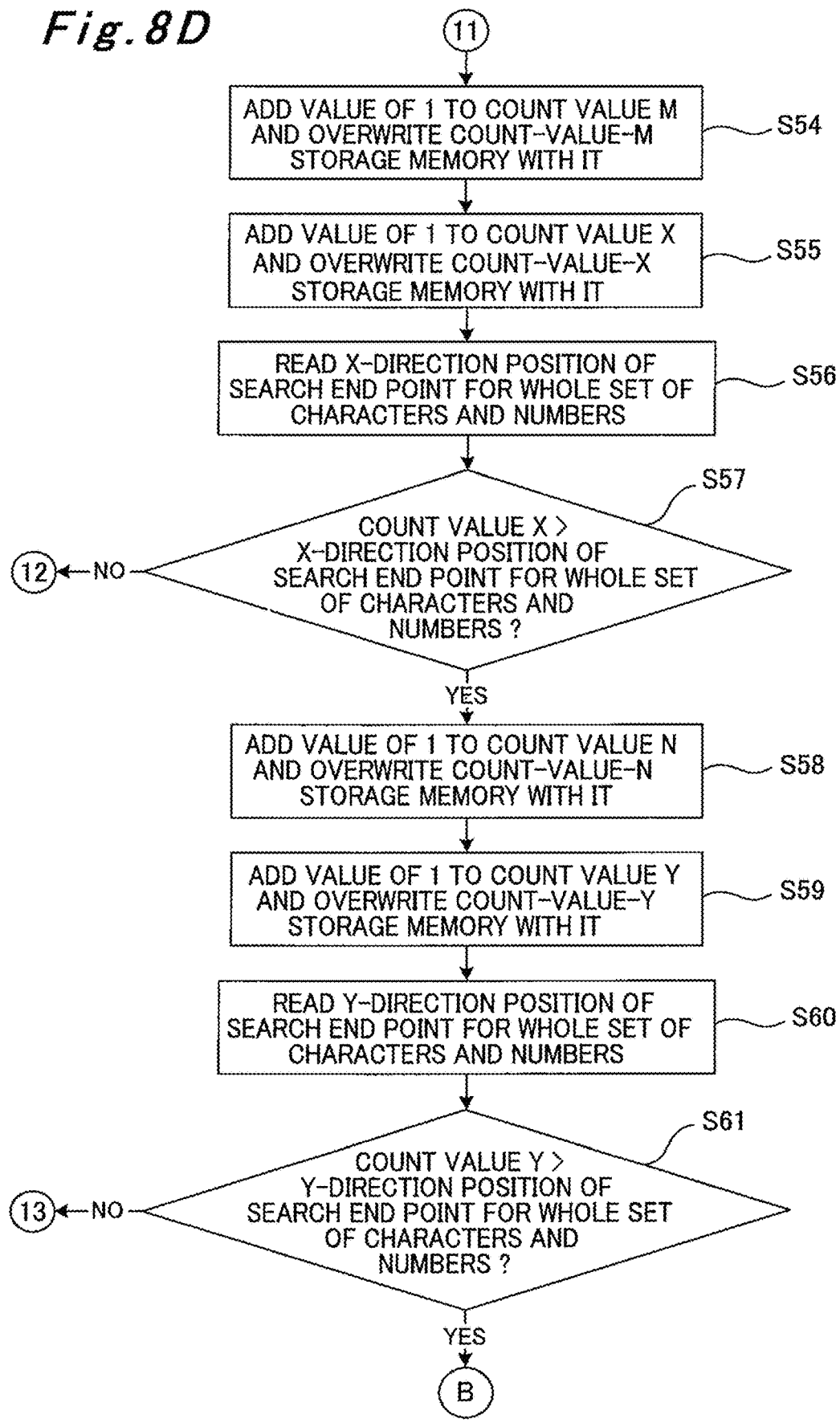
FIG. 8D is a flowchart illustrating the operation of the printing-press control device according to the embodiment of the present invention.
Figure 9A:
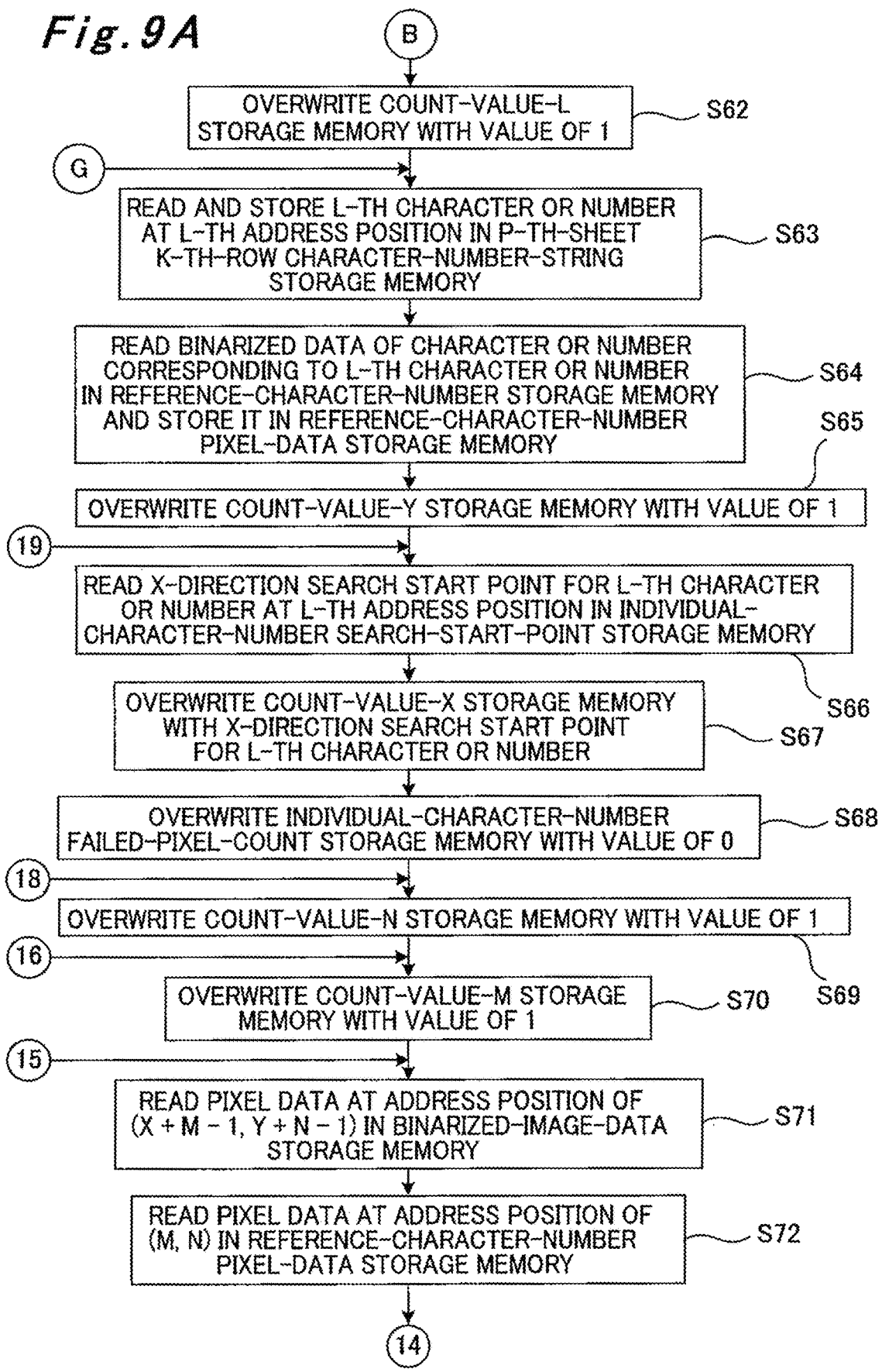
FIG. 9A is a flowchart illustrating the operation of the printing-press control device according to the embodiment of the present invention.
Figure 9B:
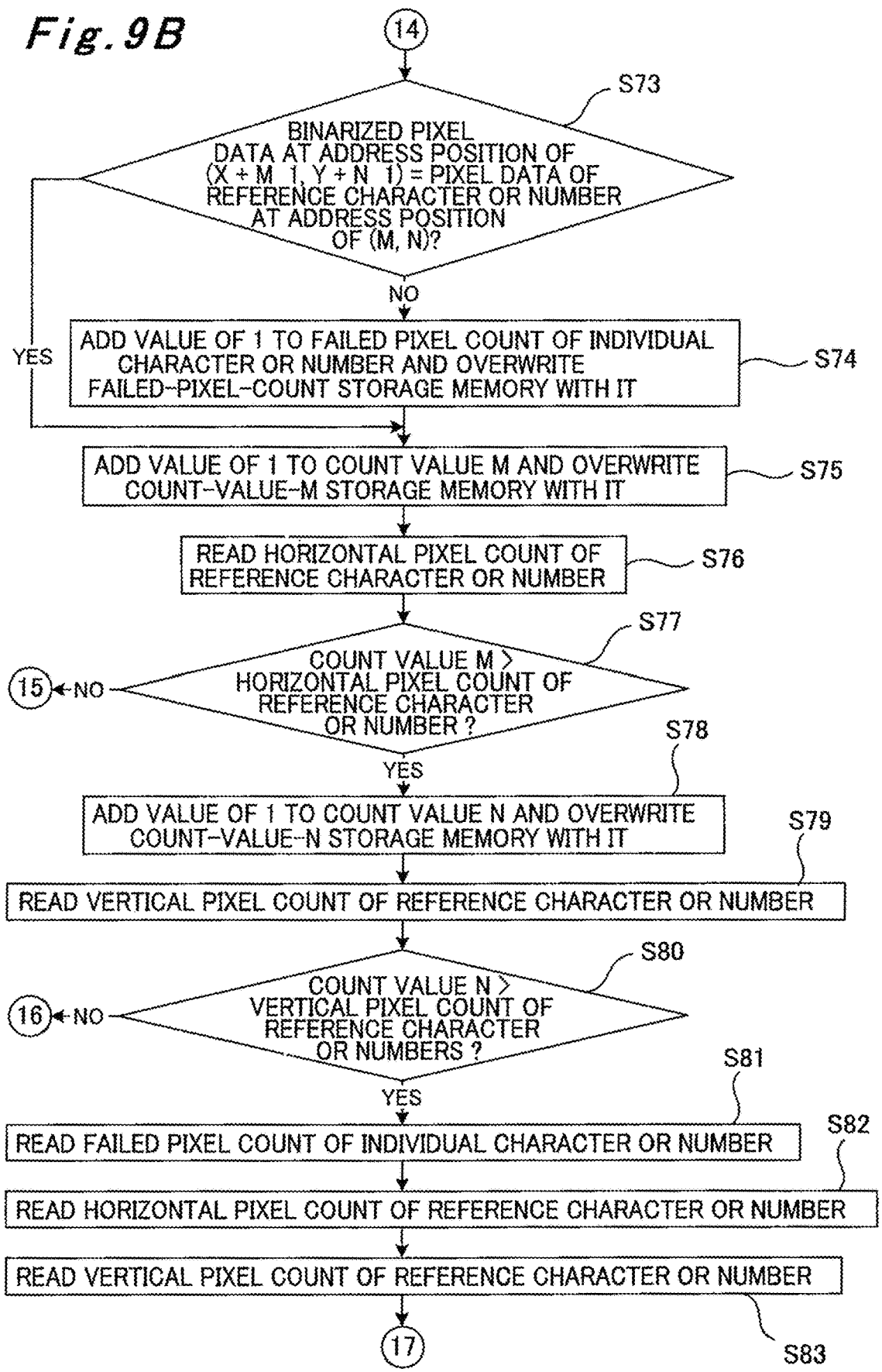
FIG. 9B is a flowchart illustrating the operation of the printing-press control device according to the embodiment of the present invention.
Figure 9C:
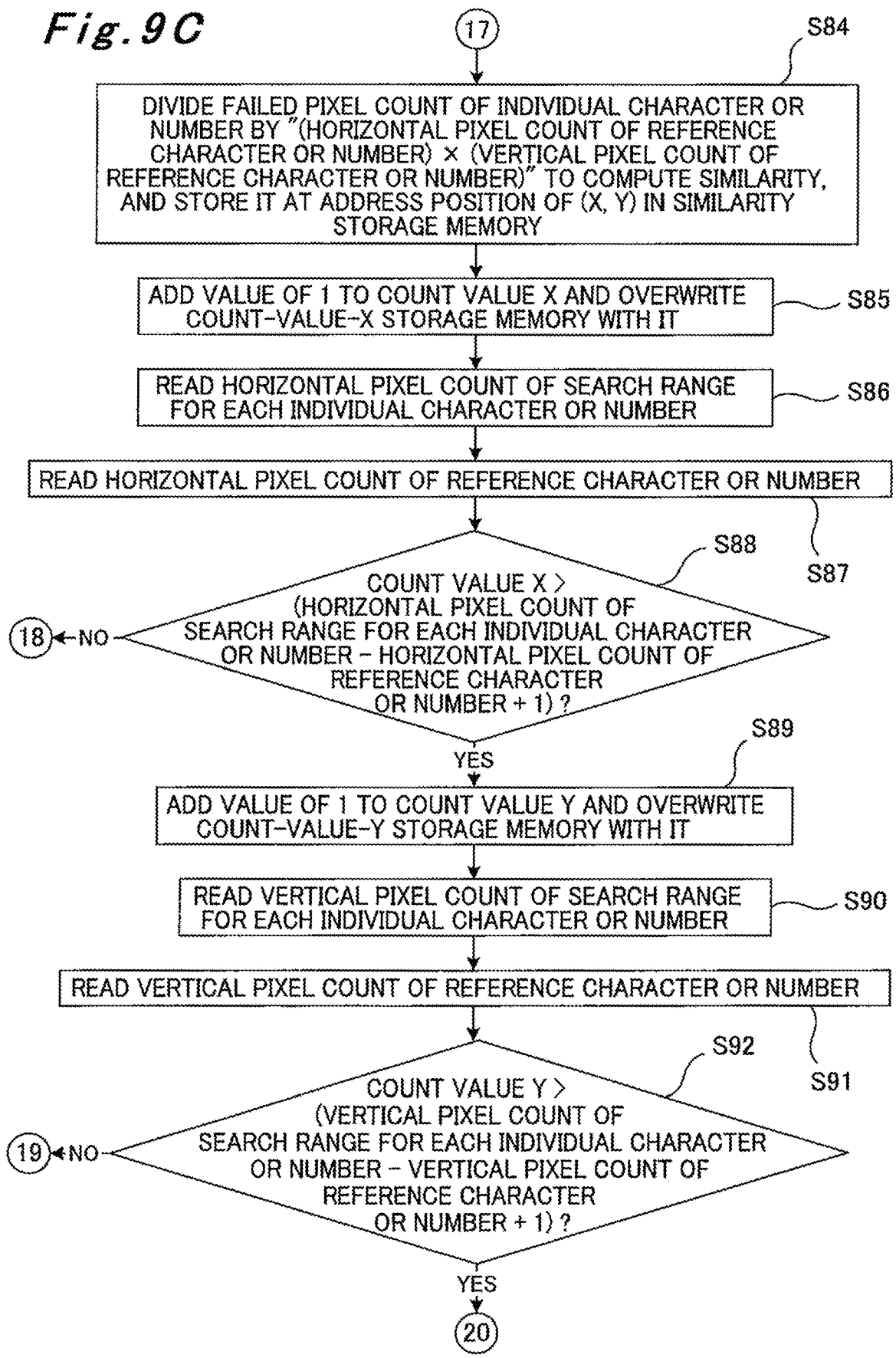
FIG. 9C is a flowchart illustrating the operation of the printing-press control device according to the embodiment of the present invention.
Figure 9D:
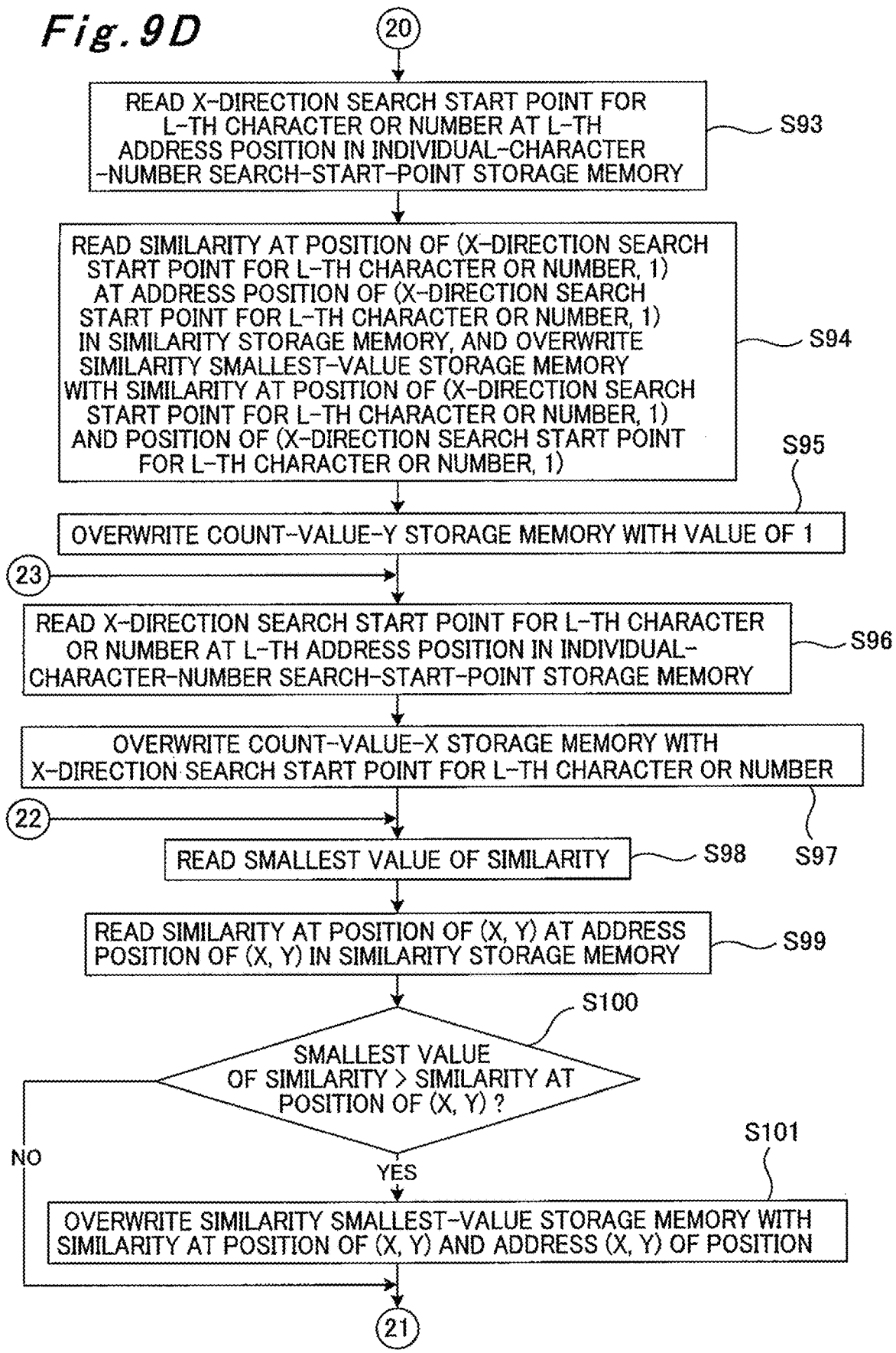
FIG. 9D is a flowchart illustrating the operation of the printing-press control device according to the embodiment of the present invention.
Figure 9E:
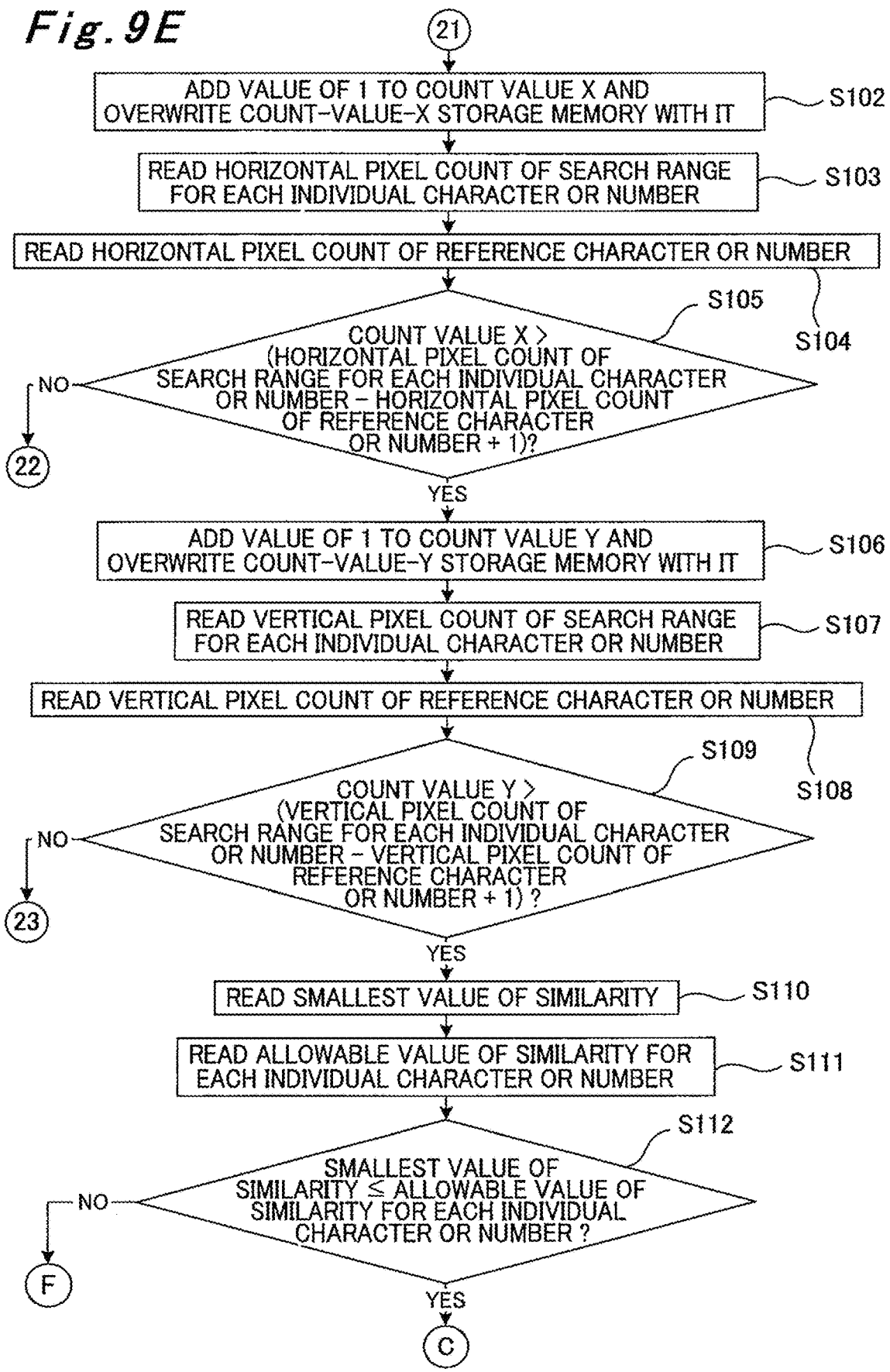
FIG. 9E is a flowchart illustrating the operation of the printing-press control device according to the embodiment of the present invention.
Figure 10A:
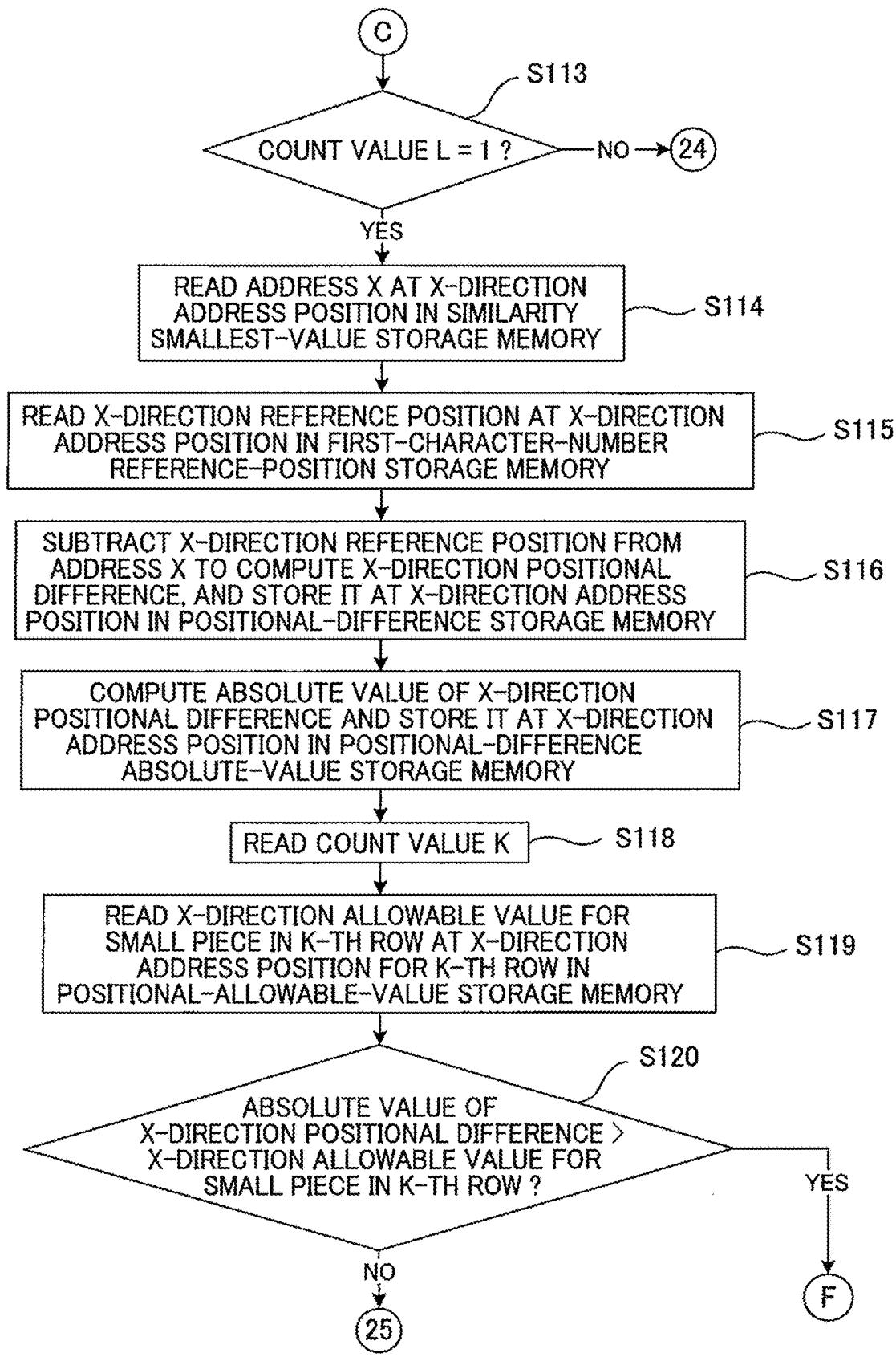
FIG. 10A is a flowchart illustrating the operation of the printing-press control device according to the embodiment of the present invention.
Figure 10B:
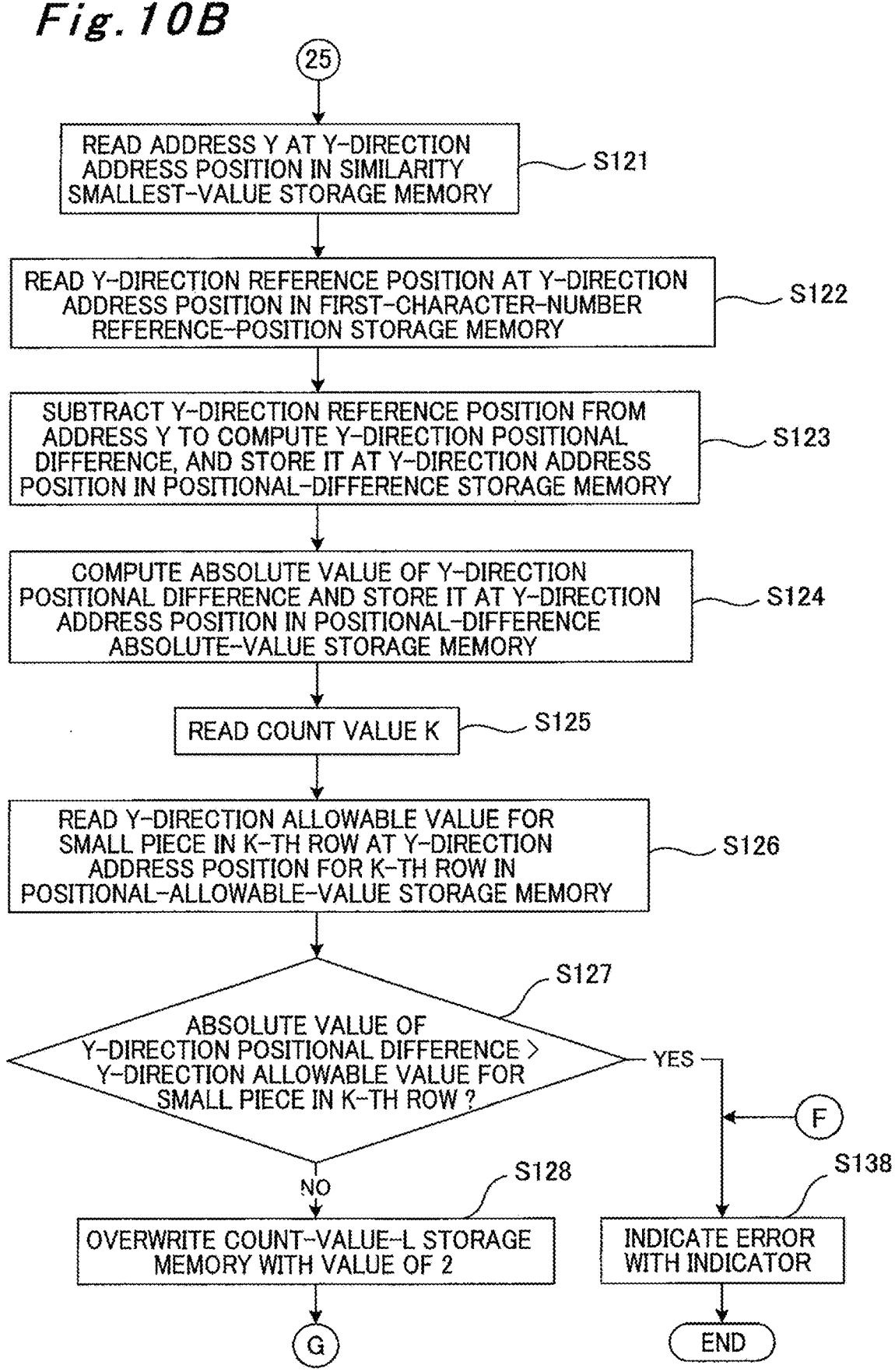
FIG. 10B is a flowchart illustrating the operation of the printing-press control device according to the embodiment of the present invention.
Figure 10C:
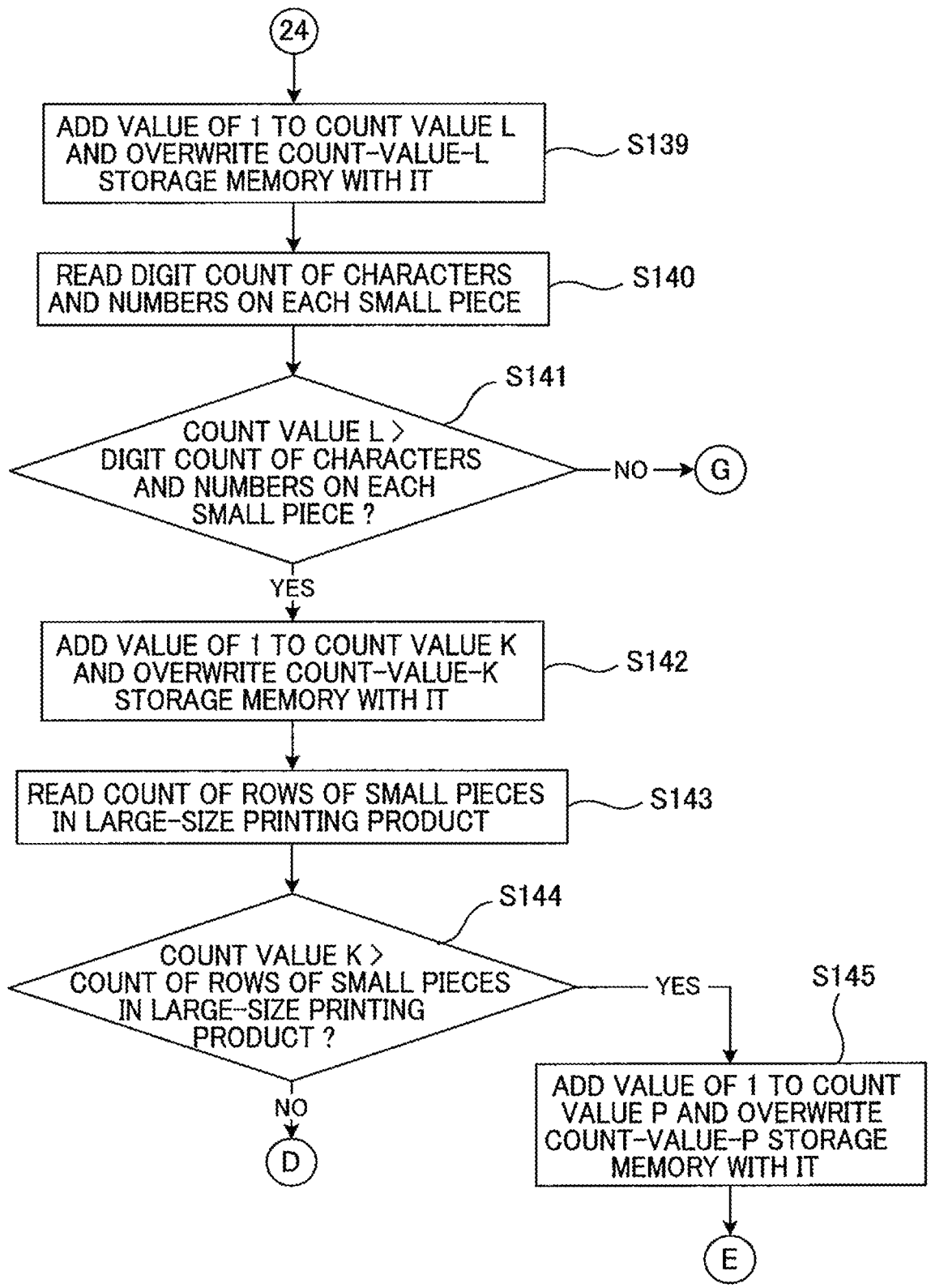
FIG. 10C is a flowchart illustrating the operation of the printing-press control device according to the embodiment of the present invention.

As illustrated in FIGS. 6A to 6C, the character-number checking device 10 is formed of a CPU 11, an ROM 12, an RAM 13, and input-output devices 14 to 17 connected to each other by a bus line.

To the bus line are connected a printed-sheet-count-value-P storage memory M11, a count-value-K storage memory M12, a character-number-string storage memory M13, a P-th-sheet K-th-row character-number-string storage memory M14, an imaging-position storage memory M15, and a numbering-and-imprinting-machine-rotational-phase-detection-counter count-value storage memory M16.

Further, to the bus line are connected a count-value-Y storage memory M17, a count-value-X storage memory M18, a captured-image-data storage memory M19, a camera horizontal-pixel-count storage memory M20, a camera vertical-pixel-count storage memory M21, a count-value-N storage memory M22, a count-value-M storage memory M23, a reference-mark pixel-data storage memory M24, and a reference-mark horizontal-pixel-count storage memory M25.

Further, to the bus line are connected a reference-mark vertical-pixel-count storage memory M26, a reference-mark measurement-position storage memory M27, a reference-mark to character-number-search-start-position distance storage memory M28, a whole-character-number search-start-point storage memory M29, a whole-character-number search-size storage memory M30, a whole-character-number search-end-point storage memory M31, a binarization-threshold storage memory M32, a binarized-image-data storage memory M33, and a count-value-L storage memory M34.

Further, to the bus line are connected an L-th-character-number storage memory M35, a reference-character-number storage memory M36, a reference-character-number pixel-data storage memory M37, an individual-character-number search-start-point storage memory M38, an individual-character-number failed-pixel-count storage memory M39, a reference-character-number horizontal-pixel-count storage memory M40, a reference-character-number vertical-pixel-count storage memory M41, a similarity storage memory M42, and an individual-character-number search-range horizontal-pixel-count storage memory M43.

Further, to the bus line are connected an individual-character-number search-range vertical-pixel-count storage memory M44, a similarity smallest-value storage memory M45, an individual-character-number similarity-allowable-value storage memory M46, a first-character-number reference-position storage memory M47, a positional-difference storage memory M48, a positional-difference absolute-value storage memory M49, a positional-allowable-value storage memory M50, an individual-small-piece character-number digit-count storage memory M51, and a large-size-printing-product small-piece-row-count storage memory M52.

Also, to the input-output device 14 are connected an input device 18 such as a keyboard and/or various switches and buttons, an indicator 19 such as a CRT and/or a lamp, and an output device 20 such as a floppy (registered trademark) disk drive and/or a printer.

Also, cameras 124 (first-number checking cameras 124B and second-number checking cameras 124C) are connected to the input-output devices 15, 16. An imaging command and an image-data transmission command are inputted from the input-output device 16 into the cameras 124 (first-number checking cameras 124B and second-number checking cameras 124C), and captured image data obtained by the cameras 124 (first-number checking cameras 124B and second-number checking cameras 124C) is outputted to the input-output device 15.

Also, a numbering-and-imprinting-machine rotational-phase detection counter 21 is connected to the input-output device 17, and this numbering-and-imprinting-machine rotational-phase detection counter 21 is connected to a numbering-and-imprinting-machine-drive-motor rotary encoder 22. Here, the numbering-and-imprinting-machine-drive-motor rotary encoder 22 is, for example, directly mounted to a rear end portion of the output shaft of a numbering-and-imprinting-machine drive motor not illustrated, and adapted to rotate 360 degrees each time the printing units 106, 111, 116 print one large-size printing product 1, output one zero pulse to reset the numbering-and-imprinting-machine rotational-phase detection counter 21 each time the numbering-and-imprinting-machine-drive-motor rotary encoder 22 rotates 360 degrees, and output a clock pulse to the numbering-and-imprinting-machine rotational-phase detection counter 21 each time the numbering-and-imprinting-machine drive motor rotates a predetermined angle.

Now, details of processing by the above character-number checking device 10 will be described through operation procedures illustrated in FIGS. 7A to 7E, FIGS. 8A to 8D, FIGS. 9A to 9E, and FIGS. 10A to 10C by using the character-number string 1b and the reference mark 1c, illustrated in FIG. 4, as an example. Note that FIG. 11 is an explanatory diagram illustrating character-number search ranges. In the diagram, reference sign A denotes a search range for the whole set of characters and numbers, reference signs A1, A2, A3, . . . , $AN_L$ denote first, second, third, . . . , and $N_L$-th search ranges, respectively, reference sign Pa denotes the horizontal pixel count of a reference character or number, and reference sign Pb denotes the vertical pixel count of the reference character or number.

Note that the operation procedures illustrated in FIGS. 7A to 7E, FIGS. 8A to 8D, FIGS. 9A to 9E, and FIGS. 10A to 10C represent an example in which one of the rows of small pieces 1a in a large-size printing product 1 is checked based on an image obtained by one camera 124 among the plurality of first-number checking cameras 124B and second-number checking cameras 124C. Similar processing is performed for the processing performed based on images obtained by the other first-number checking cameras 124B and second-number checking cameras 124C. Also, the following description will be given by assuming that the character-number string 1b side relative to the reference mark 1c is the positive side.

In the character-number checking device 10, firstly, in step S1, the printed-sheet-count-value-P storage memory M11 is overwritten with a value of 1. In step S2, the count-value-K storage memory M12 is overwritten with a value of 1. In step S3, the character-number string 1b in the K-th row on the P-th sheet at an address position for the K-th row on the P-th sheet in the character-number-string storage memory M13 is read and stored in the memory M14.

In short, steps S1 to S3 serve as a first process in which the character-number string 1b for the small piece 1a in the first row (K=1) on the first large-size printing product (P=1) is read out and stored.

In step S4 after step S3, the imaging position for the small piece 1a in the K-th row at an address position for the K-th row in the imaging-position storage memory M15 is read. In step S5, the count value of the numbering-and-imprinting-machine rotational-phase detection counter 21 is read and stored in the memory M16. If the count value of the numbering-and-imprinting-machine rotational-phase detection counter 21 is not the imaging position for the small piece 1a in the K-th row in step S6 (NO), the processing returns to step S5. If the count value of the numbering-and-imprinting-machine rotational-phase detection counter 21 is the imaging position for the small piece 1a in the K-th row (YES), an imaging command is outputted to the camera 124 through the input-output device 16 in step S7.

In step S8 after step S7, an image-data transmission command is outputted to the camera 124 through the input-output device 16. If no captured image data has been outputted from the camera 124 to the input-output device 15 in step S9 (NO), this process of step S9 is repeated. If captured image data is outputted from the camera 124 to the input-output device 15 (YES), the processing proceeds to step S10.

In step S10, the count-value-Y storage memory M17 is overwritten with a value of 1. In step S11, the count-value-X storage memory M18 is overwritten with 1. In step S12, pixel data is read from the camera 124 and stored at the address position of (X, Y) in the captured-image-data storage memory M19.

Thereafter in step S13, a value of 1 is added to a count value X and the count-value-X storage memory M18 is overwritten with it. In Step S14, the horizontal pixel count of the camera 124 in the memory 20 is read.

Thereafter, if the count value X is less than the horizontal pixel count of the camera 124 in step S15 (NO), the processing returns to step S12. If the count value X is greater than the horizontal pixel count of the camera 124 (YES), a value of 1 is added to a count value Y and the count-value-Y storage memory M17 is overwritten with it in step S16.

In step S17 after step S16, the vertical pixel count of the camera 124 in the memory M21 is read. If the count value Y is less than the vertical pixel count of the camera 124 in step S18 (NO), the processing returns to step S11. If the count value Y is greater than the vertical pixel count of the camera 124 (YES), the processing proceeds to step S19.

In short, steps S4 to S18 serve as a second process in which the small piece 1*a* in the first row (K=1) is imaged in accordance with the rotational phase of the printing press and the captured image stored.

In step S19, the count-value-Y storage memory M17 is overwritten with a value of 1. In step S20, the count-value-X storage memory M18 is overwritten with a value of 1. In step S21, the count-value-N storage memory M22 is overwritten with a value of 1. In step S22, the count-value-M storage memory M23 is overwritten with a value of 1.

Thereafter in step S23, the pixel data at the address position of (X+M−1, Y+N−1) in the captured-image-data storage memory M19 is read. In step S24, pixel data of the reference mark 1*c* at the address position of (M, N) in the reference-mark pixel-data storage memory M24 is read.

Thereafter, if the pixel data at the address position of (X+M−1, Y+N−1) is identical to the pixel data of the reference mark 1*c* at the address position of (M, N) in step S25 (YES), the processing proceeds to step S26. On the other hand, if the pixel data at the address position of (X+M−1, Y+N−1) is different from the pixel data of the reference mark 1*c* at the address position of (M, N) (NO), the processing proceeds to step S129 to be described later.

In step S26, a value of 1 is added to a count value M and the count-value-M storage memory M23 is overwritten with it. Thereafter in step S27, the horizontal pixel count of the reference mark 1*c* in the memory 25 is read.

Thereafter, if the count value M is less than or equal to the horizontal pixel count of the reference mark 1*c* in step S28 (NO), the processing returns of step S23. If the count value M is greater than the horizontal pixel count of the reference mark 1*c* (YES), a value of 1 is added to a count value N and the count-value-N storage memory M22 is overwritten with it in step S29.

In step S30 after step S29, the vertical pixel count of the reference mark 1*c* in the memory M26 is read. If the count value N is less than or equal to the vertical pixel count of the reference mark 1*c* in step S31 (NO), the processing returns of step S22. If the count value N is greater than the vertical pixel count of the reference mark 1*c* (YES), the count value X in the memory M18 is read in step S32.

In step S33 after step S32, the count value X is stored at an X-direction address position in the reference-mark measurement-position storage memory M27 as an X-direction measurement position of the reference mark 1*c*. In step S34, the count value Y in the memory M17 is read. In step S35, the count value Y is stored at a Y-direction address position in the reference-mark measurement-position storage memory M27 as a Y-direction measurement position of the reference mark 1*c*. Then, processes in and after step S36 to be described later are performed.

Note that if the processing proceeds to step S129 from the above-described step S25, a value of 1 is added to the count value X and the count-value-X storage memory M18 is overwritten with it in step S129. In step S130, the horizontal pixel count of the camera 124 in the memory M20 is read. In step S131, the horizontal pixel count of the reference mark 1*c* in the memory M25 is read.

Thereafter, if the count value X is less than or equal to (the horizontal pixel count of the camera−the horizontal pixel count of the reference mark) in step S132 (NO), the processing returns to step S21. If the count value X is greater than (the horizontal pixel count of the camera−the horizontal pixel count of the reference mark) (YES), a value of 1 is added to the count value Y and the count-value-Y storage memory M17 is overwritten with it in step S133.

Thereafter in step S134, the vertical pixel count of the camera 124 in the memory M21 is read. In step S135, the vertical pixel count of the reference mark 1*c* in the memory M26 is read. Thereafter, if the count value Y is less than or equal to (the vertical pixel count of the camera−the vertical pixel count of the reference mark) in step S136 (NO), the processing returns to step S20. If the count value Y is greater than (the vertical pixel count of the camera−the vertical pixel count of the reference mark) (YES), the processing proceeds to step S138 illustrated in FIG. 10B, in which an error is indicated with the indicator 19.

In short, steps S19 to S35 and steps S129 to S136 serve as a third process in which the reference mark 1*c* is figured out from the image data obtained in the above-described second process by using pattern matching and its position is stored, and an error is indicated if the reference mark 1*c* cannot be detected.

After proceeding to step S36 from step S35, the X-direction measurement position of the reference mark 1*c* at the X-direction address position in the reference-mark measurement-position storage memory M27 is read in step S36.

In step S37, the distance from the reference mark 1*c* to a character-number search start point in the X direction at an X-direction address position in the reference-mark to character-number-search-start-point distance storage memory M28 is read.

Thereafter in step S38, the distance from the reference mark 1*c* to the character-number search start point in the X direction is added to the X-direction measurement position of the reference mark 1*c* to compute the X-direction position of the search start point for the whole set of characters and numbers, and the X-direction position is stored at an X-direction address position in the whole-character-number search-start-point storage memory M29.

Thereafter in step S39, the horizontal length of a search range for the whole set of characters and numbers (see A illustrated in FIG. 11) at an X-direction address position in the whole-character-number search-size storage memory M30 is read. In step S40, the horizontal length of the search range for the whole set of characters and numbers is added to the X-direction position of the search start point for the whole set of characters and numbers to compute the X-direction position of a search end point for the whole set of characters and numbers, and the X-direction position is stored at an X-direction address position in the whole-character-number search-end-point storage memory M31.

Thereafter in step S41, the Y-direction measurement position of the reference mark 1c at the Y-direction address position in the reference-mark measurement-position storage memory M27 is read. In step S42, the distance from the reference mark 1c to the character-number search start point in the Y direction at a Y-direction address position in the reference-mark to character-number-search-start-point distance storage memory M28 is read.

Thereafter in step S43, the distance from the reference mark 1c to the character-number search start point in the Y direction is added to the Y-direction measurement position of the reference mark 1c to compute the Y-direction position of the search start point for the whole set of characters and numbers, and the Y-direction position is stored at a Y-direction address position in the whole-character-number search-start-point storage memory M29.

Thereafter in step S44, the vertical length of the search range for the whole set of characters and numbers at a Y-direction address position in the whole-character-number search-size storage memory M30 is read. In step S45, the vertical length of the search range for the whole set of characters and numbers is added to the Y-direction position of the search start point for the whole set of characters and numbers to compute the Y-direction position of the search end point for the whole set of characters and numbers, and the Y-direction position is stored at a Y-direction address position in the whole-character-number search-end-point storage memory M31.

In short, steps S36 to S45 serve as a fourth process in which a range in which the character-number string 1b is assumed to be present is figured out from the position of the reference mark 1c figured out in the above-described third process.

In step S46 after step S45, the count-value-Y storage memory M17 is overwritten with the Y-direction position of the search start point for the whole set of characters and numbers. In step S47, the count-value-X storage memory M18 is overwritten with the X-direction position of the search start point for the whole set of characters and numbers. In step S48, the count-value-N storage memory M22 is overwritten with a value of 1. In step S49, the count-value-M storage memory M23 is overwritten with a value of 1.

Thereafter in step S50, the pixel data at the address (X, Y) at the address position of (X, Y) in the captured-image-data storage memory M19 is read. In step S51, a binarization threshold in the memory M32 is read.

Thereafter, if the pixel data at the address (X, Y) is greater than or equal to the binarization threshold in step S52 (YES), the address position of (M, N) in the binarized-image-data storage memory M33 is overwritten with "1" in step S53. On the other hand, if the pixel data at the address (X, Y) is less than the binarization threshold (NO), the processing proceeds to step S137, in which the address position of (M, N) in the binarized-image-data storage memory M33 is overwritten with "0". The processing then proceeds to step S54 to be described below.

In step S54, a value of 1 is added to the count value M and the count-value-M storage memory M23 is overwritten with it. Thereafter in step S55, a value of 1 is added to the count value X and the count-value-X storage memory M18 is overwritten with it. In step S56, the X-direction position of the search end point for the whole set of characters and numbers in the memory M31 is read.

Thereafter, if the count value X is less than or equal to the X-direction position of the search endpoint for the whole set of characters and numbers in step S57 (NO), the processing returns to step S48. If the count value X is greater than the X-direction position of the search end point for the whole set of characters and numbers (YES), a value of 1 is added to the count value N and the count-value-N storage memory M22 is overwritten with it in step S58.

In step S59 after step S58, a value of 1 is added to the count value Y and the count-value-Y storage memory M17 is overwritten with it. In step S60, the Y-direction position of the search endpoint for the whole set of characters and numbers in the memory M31 is read. Thereafter, if the count value Y is less than or equal to the Y-direction position of the search end point for the whole set of characters and numbers in step S61 (NO), the processing returns to step S47. If the count value Y is greater than the Y-direction position of the search end point for the whole set of characters and numbers (YES), processes in and after step S62 are performed.

In short, steps S46 to S61 and step S137 serves as a fifth process in which the image data in the range figured out in the above-described fourth process, in which the character-number string 1b is assumed to be present, is binarized.

In step S62, the count-value-L storage memory M34 is overwritten with a value of 1. Thereafter in step S63, the L-th character or number at the L-th address position in the P-th-sheet K-th-row character-number-string storage memory M14 is read and stored in the memory M35. In step S64, the binarized data of the character or number corresponding to the L-th character or number in the reference-character-number storage memory M36 is read and stored in the reference-character-number pixel-data storage memory M37.

In short, steps S62 to S64 serve as a sixth process in which the first (L=1) character or number is figured out from the character-number string 1b stored in the above-described first process, and the corresponding binarized pixel data is stored as a reference image.

In step S65 after step S64, the count-value-Y storage memory M17 is overwritten with a value of 1. In step S66, an X-direction search start point for the L-th character or number at the L-th address position in the individual-character-number search-start-point storage memory M38 is read. In step S67, the count-value-X storage memory M18 is overwritten with the X-direction search start point for the L-th character or number.

Thereafter in step S68, the individual-character-number failed-pixel-count storage memory M39 is overwritten with a value of 0. In step S69, the count-value-N storage memory M22 is overwritten with a value of 1. In step S70, the count-value-M storage memory M23 is overwritten with a value of 1.

Thereafter in step S71, the pixel data at the address position of (X+M−1, Y+N−1) in the binarized-image-data storage memory M33 is read. In step S72, the pixel data at the address position of (M, N) in the reference-character-number pixel-data storage memory M37 is read.

Thereafter, if the binarized pixel data at the address position of (X+M−1, Y+N−1) is not identical to the pixel data of the reference character or number at the address position of (M, N) in step S73 (NO), a value of 1 is added to the failed pixel count of the individual character or number and the failed-pixel-count storage memory M39 is overwritten with it. The processing then proceeds to step S75. On the other hand, if the binarized pixel data at the address position of (X+M−1, Y+N−1) is identical to the pixel data of the reference character or number at the address position of (M, N) (YES), the processing proceeds to step S75 to be described below.

In step S75, a value of 1 is added to the count value M and the count-value-M storage memory M23 is overwritten with it. Thereafter in step S76, the horizontal pixel count of the reference character or number (see Pa illustrated in FIG. 11, for example) in the memory M40 is read.

Thereafter, if the count value M is less than or equal to the horizontal pixel count of the reference character or number in step S77 (NO), the processing returns to step S71. If the count value M is greater than the horizontal pixel count of the reference character or number (YES), a value of 1 is added to the count value N and the count-value-N storage memory M22 is overwritten with it in step S78.

In step S79 after step S78, the vertical pixel count of the reference character or number (see Pb illustrated in FIG. 11, for example) in the memory M41 is read. If the count value N is less than or equal to the vertical pixel count of the reference character or number in step S80 (NO), the processing returns to step S70. If the count value N is greater than the vertical pixel count of the reference character or number (YES), the failed pixel count of the individual character or number in the memory M39 is read in step S81.

Thereafter in step S82, the horizontal pixel count of the reference character or number in the memory M40 is read. In step S83, the vertical pixel count of the reference character or number in the memory M41 is read.

In step S84 after step S83, the failed pixel count of the individual character or number is divided by "(the horizontal pixel count of the reference character or number)×(the vertical pixel count of the reference character or number)" to compute similarity, and the similarity is stored at the address position of (X, Y) in the similarity storage memory M42. In step S85, a value of 1 is added to the count value X and the count-value-X storage memory M18 is overwritten with it. In step S86, the horizontal pixel count of the search range for each individual character or number (see A1 to $AN_L$ illustrated in FIG. 11) in the memory M43 is read.

Thereafter in step S87, the horizontal pixel count of the reference character or number in the memory M40 is read. If the count value X is less than or equal to (the horizontal pixel count of the search range for each individual character or number−the horizontal pixel count of the reference character or number+1) in step S88 (NO), the processing returns to step S69. If the count value X is greater than (the horizontal pixel count of the search range for each individual character or number−the horizontal pixel count of the reference character or number+1) (YES), a value of 1 is added to the count value Y and the count-value-Y storage memory M17 is overwritten with it in step S89.

Thereafter in step S90, the vertical pixel count of the search range for each individual character or number in the memory M44 is read. In step S91, the vertical pixel count of the reference character or number in the memory M41 is read.

Thereafter, if the count value Y is less than or equal to (the vertical pixel count of the search range for each individual character or number−the vertical pixel count of the reference character or number+1) in step S92 (NO), the processing returns to step S66. If the count value Y is greater than (the vertical pixel count of the search range for each individual character or number−the vertical pixel count of the reference character or number+1) (YES), the processing proceeds to step S93.

In short, steps S65 to S92 serve as a seventh process in which similarity to the reference image stored in the above-described sixth process (the ratio of different pixels) at each of a plurality of positions in the range (A1) where the first (L=1) character or number in the image data binarized in the above-described fifth process is assumed to be present, is figured out by using pattern matching.

Specifically, as illustrated in FIG. 11, a region corresponding to the reference image (a region with a horizontal pixel count of Pa and a vertical pixel count of Pb) is shifted in the X direction and the Y direction within the search range A1, in which the first character or number is assumed to be present, to perform matching with the reference image and figure out similarity to the reference image (the ratio of different pixels) at each position.

In step S93, the X-direction search start point for the L-th character or number at the L-th address position in the individual-character-number search-start-point storage memory M38 is read. Thereafter in step S94, the similarity at the position of (the X-direction search start point for the L-th character or number, 1) at the address position of (the X-direction search start point for the L-th character or number, 1) in the similarity storage memory M42 is read, and the similarity smallest-value storage memory M45 is overwritten with the similarity at the position of (the X-direction search start point for the L-th character or number, 1) and the position of (the X-direction search start point for the L-th character or number, 1).

Thereafter in step S95, the count-value-Y storage memory M17 is overwritten with a value of 1. In step S96, the X-direction search start point for the L-th character or number at the L-th address position in the individual-character-number search-start-point storage memory M38 is read. In step S97, the count-value-X storage memory M18 is overwritten with the X-direction search start point for the L-th character or number.

Thereafter in step S98, the smallest value of the similarity in the memory M45 is read. In step S99, the similarity at the position of (X, Y) at the address position of (X, Y) in the similarity storage memory M42 is read.

Thereafter, if the smallest value of the similarity is greater than the similarity at the position of (X, Y) in step S100 (YES), the similarity smallest-value storage memory M45 is overwritten with the similarity at the position of (X, Y) and the address (X, Y) of the position in step S101. The processing then proceeds to step S102. On the other hand, if the smallest value of the similarity is less than or equal to the similarity at the position of (X, Y) (NO), the processing proceeds to step S102 to be described below.

In step S102, a value of 1 is added to the count value X and the count-value-X storage memory M18 is overwritten with it. Thereafter in step S103, the horizontal pixel count of the search range for each individual character or number in the memory M43 is read. In step S104, the horizontal pixel count of the reference character or number in the memory M40 is read.

Thereafter, if the count value X is less than or equal to (the horizontal pixel count of the search range for each individual character or number−the horizontal pixel count of the reference character or number+1) in step S105 (NO), the processing returns to step S98. If the count value X is greater than (the horizontal pixel count of the search range for each individual character or number−the horizontal pixel count of the reference character or number+1) (YES), a value of 1 is added to the count value Y and the count-value-Y storage memory M17 is overwritten with it in step S106.

In step S107 after step S106, the vertical pixel count of the search range for each individual character or number in the memory M44 is read. In step S108, the vertical pixel count of the reference character or number in the memory M41 is read.

Thereafter, if the count value Y is less than or equal to (the vertical pixel count of the search range for each individual character or number−the vertical pixel count of the reference character or number+1) in step S109 (NO), the processing returns to step S96. If the count value Y is greater than (the vertical pixel count of the search range for each individual character or number−the vertical pixel count of the reference character or number+1) (YES), the processing proceeds to step S110.

In short, steps S93 to S109 serve as an eighth process in which among the values of similarity to the reference image (the ratio of different pixels) figured out in the above-described seventh process at the positions of a plurality of search regions within the range A1, in which the first (L=1) character or number is assumed to be present, the smallest value of the similarity and its position are figured out.

In other words, the position of the search region that has the smallest similarity to the reference image (the smallest ratio of different pixels) in the range A1, in which the first character or number is assumed to be present, is figured out as the position of the first character or number.

In step S110, the smallest value of the similarity in the memory M45 is read. Thereafter in step S111, an allowable value in the memory M46 is read which serves as a criterion for judging the similarity of each individual character or number. If the smallest value of the similarity is less than or equal to the allowable value of the similarity for each individual character or number in step S112 (YES), processes in and after step S113 are performed. On the other hand, if the smallest value of the similarity is greater than the allowable value of the similarity for each individual character or number (NO), the processing proceeds to step S138, illustrated in FIG. 10B, in which an error is indicated with the indicator 19.

Here, in this embodiment, the individual-character-number similarity-allowable-value storage memory M46 stores a common value for all rows of small pieces 1a as the allowable value of the similarity for each individual character or number.

In short, the above-described steps S110 to S112 serve as a ninth process in which the smallest similarity figured out in the above-described eighth process and the common allowable value for each individual character or number are compared with each other. An error is indicated if the smallest similarity is greater than the common allowable value for each individual character or number.

If the count value L is 1 in step S113 (YES), the address X at the X-direction address position in the similarity smallest-value storage memory M45 is read in step S114. On the other hand, if the count value L is other than 1 (NO), the processing proceeds to step S139 to be described later.

In step S115 after step S114, an X-direction reference position at an X-direction address position in the first-character-number reference-position storage memory M47 is read. In step S116, the X-direction reference position is subtracted from the address X to compute the X-direction positional difference, and it is stored at an X-direction address position in the positional-difference storage memory M48. In step S117, the absolute value of the X-direction positional difference is computed and stored at an X-direction address position in the positional-difference absolute-value storage memory M49.

In step S118 after step S117, a count value K in the memory M12 is read. In step S119, an allowable value at an X-direction address position for the K-th row in the positional-allowable-value storage memory M50 is read which serves as a criterion for judging the small piece 1a in the K-th row in the X direction.

Here, in this embodiment, in consideration of the stretch of the patterns on the trailing edge side of the large-size printing product 1, the positional-allowable-value storage memory M50 stores an allowable value for the X-direction positions of small pieces 1a individually for each row (count value K). Specifically, the allowable value for the X-direction position of the characters and numbers relative to the reference mark 1c on a small piece 1a on the trailing edge side is greater than the allowable value for the X-direction position of the characters and numbers relative to the reference mark 1c on a small piece 1a on the leading edge side.

Thereafter, if the absolute value of the X-direction positional difference is less than or equal to the X-direction allowable value for the small piece 1a in the K-th row in step S120 (NO), the address Y at the Y-direction address position in the similarity smallest-value storage memory M45 is read in step S121. On the other hand, if the absolute value of the X-direction positional difference is greater than the X-direction allowable value for the small piece 1a in the K-th row (YES), the processing proceeds to step S138, illustrated in FIG. 10B, in which an error is indicated with the indicator 19.

In step S122 after step S121, a Y-direction reference position at a Y-direction address position in the first-character-number reference-position storage memory M47 is read. In step S123, the Y-direction reference position is subtracted from the address Y to compute the Y-direction positional difference, and it is stored at a Y-direction address position in the positional-difference storage memory M48.

Thereafter in step S124, the absolute value of the Y-direction positional difference is computed and stored at a Y-direction address position in the positional-difference absolute-value storage memory M49. In step S125, the count value K in the memory M12 is read.

Thereafter in step S126, an allowable value at a Y-direction address position for the K-th row in the positional-allowable-value storage memory M50 is read which serves as a criterion for judging the small piece 1a in the K-th row in the Y direction.

Here, in this embodiment, in consideration of the stretch of the patterns on the trailing edge side of the large-size printing product 1, the positional-allowable-value storage memory M50 stores an allowable value for the Y-direction positions of small pieces 1a individually for each row (count value K). Specifically, the allowable value for the Y-direction position of the characters and numbers relative to the reference mark 1c on a small piece 1a on the trailing edge side is greater than the allowable value for the Y-direction position of the characters and numbers relative to the reference mark 1c on a small piece 1a on the leading edge side.

Thereafter, if the absolute value of the Y-direction positional difference is less than or equal to the Y-direction allowable value for the small piece 1a in the K-th row in step S127 (NO), the processing proceeds to step S128. On the other hand, if the absolute value of the Y-direction positional difference is greater than the Y-direction allowable value for the small piece 1a in the K-th row (YES), the processing proceeds to step S138, illustrated in FIG. 10B, in which an error is indicated with the indicator 19.

In short, steps S113 to S127 and step S138 serve as a 10th process in which the difference between the position with the smallest similarity to the reference image of the first character or number figured out in the above-described ninth process and a preset reference position relative to the position of the reference mark (hereinafter, simply referred to as the difference from the reference position) is figured out and the difference from the reference position thus figured out and a positional allowable value being a criterion for judgment set individually for each row of small pieces 1a are compared with each other, and an error is indicated if the difference from the reference position is greater than the positional allowable value.

In step S128, the count-value-L storage memory M34 is overwritten with a value of 2, and the processing returns to step S63.

Also, if the processing proceeds to step S139 from step S113, a value of 1 is added to the count value L and the count-value-L storage memory M34 is overwritten with it in step S139. In step S140, the digit count of the characters and numbers on each small piece 1a in the memory M51 is read.

Thereafter, if the count value L is less than or equal to the digit count of the characters and numbers on each small piece 1a in step S141 (NO), the processing returns to step S63. If the count value L is greater than the digit count of the characters and numbers on each small piece 1a (YES), a value of 1 is added to the count value K and the count-value-K storage memory M12 is overwritten with it in step S142.

In step S143, the count of rows of small pieces 1a in a large-size printing product in the memory M52 is read. If the count value K is less than or equal to the count of rows of small pieces 1a in a large-size printing product in step S144 (NO), the processing returns to step S3. If the count value K is greater than the count of rows of small pieces 1a in a large-size printing product (YES), a value of 1 is added to a printed-sheet count value P and the printed-sheet-count-value-P storage memory M11 is overwritten with it in step S145. The processing then returns to step S2.

In short, step S128 and steps S139 to S145 serve as: an 11th process in which processes similar to the sixth to ninth processes are repeated for the second (L=2) character or number to the last (L=$N_L$) character or number; a 12th process in which processes similar to the first to 11th processes are repeated for the small piece 1a in the second (K=2) row to the small piece 1a in the last (K=$N_K$) row; and a 13th process in which processes similar to the first to 12th processes are repeated for the second (P=2) large-size printing product to the last (P=$N_P$) large-size printing product (that is, until the end of the printing).

To sum up, in this embodiment, an allowable value (criterion) for judging whether or not the characters and numbers printed on a small piece 1a are acceptable is set individually for each row (count value K) in consideration of the stretch of the patterns on the trailing edge side of the large-size printing product 1. Also, individual allowable values can be set only for a necessary checking item such that a common allowable value is used for all small pieces 1a in the checking of the shape-wise similarity of each individual character or number whereas an allowable value set differently for each row is used in the checking of the position of the character-number string 1b relative to the reference mark 1c. Also, the positional relation between the reference mark 1c and the character-number string 1b is checked using only the character or number at the closest position to the reference mark 1c, and the similarity to the character-number reference image is figured out for all characters and numbers.

With the securities character-number checking apparatus according to this embodiment with the above configuration, the characters and numbers on the trailing edge side of a large-size printing product 1 where the patterns are stretched can be judged to have been printed properly as long as the shape-wise similarity of the characters and numbers is less than or equal to an allowable value, even though the position of the characters and numbers relative to the reference mark 1c is somewhat offset as compared to that on the leading edge side. In this way, it is possible to maintain the accuracy of checking of the shape-wise similarity of each individual character or number and prevent an erroneous indication of an error. Hence, the quality of the checking can be improved.

In the above embodiment, an example has been presented in which only a single column of small pieces 1a is checked and an allowable value for the position of each small piece 1a is set individually for each row (count value K). Note that the stretch of the patterns may also differ depending on the position of the column. For this reason, an allowable value for the position of each small piece 1a is preferably set individually for each row and for each column. However, it is needless to say that the present invention is not limited to the above embodiments but, for example, an allowable value for the position of at least one small piece 1a may be set differently from an allowable value for the positions of other small pieces 1a in accordance with the stretch of the pattern at the trailing edge, and various changes can be made without departing from the gist of the present invention.

APPLICABILITY

The present invention is applicable to a securities character-number checking apparatus and a securities character-number checking method.

EXPLANATION OF REFERENCE NUMERALS 1 large-size printing product (printing sheet)
1a small piece
1b character-number string
1c reference mark
10 character-number checking device
11 CPU
12 ROM
13 RAM
14 to 17 input-output device
18 input device
19 indicator
20 output device
21 numbering-and-imprinting-machine rotational-phase detection counter
22 numbering-and-imprinting-machine-drive-motor rotary encoder
100 combined printing press
101 sheet feeder
102 feeder board
103 swing arm shaft pregripper
104 transfer cylinder
105 transfer cylinder
106 seal printing unit
107 impression cylinder
108 seal cylinder
109 inking device
110 transport cylinder 111 first-number printing unit
112 impression cylinder
113 first-number cylinder
114 inking device
115 transport cylinder
116 second-number printing unit
117 impression cylinder
118 second-number cylinder
119 inking device
120 transport cylinder
121 first drying unit
122 transport cylinder
123 drying lamp
124A seal checking camera
124B first-number checking camera
124C second-number checking camera
125A to 125C lighting device
126 other-surface coating unit
127 impression cylinder
128 other-surface coating cylinder
129 anilox roller
130 chamber coater
131 transport cylinder
132 second drying unit
133 transport cylinder
134 drying lamp
135 one-surface coating unit
136 impression cylinder
137 one-surface coating cylinder
138 anilox roller
139 chamber coater
140 delivery unit
141 delivery cylinder
142 transport chain
143a to 143c pile board
144 suction guide
145 drying lamp
M11 to M52 memory

The invention claimed is:

1. A securities character-number checking apparatus including an imaging device that is configured to capture images of serial numbers printed on a plurality of securities printed on a printing sheet,
   a CPU that is configured to judge whether or not the serial numbers printed on the securities are acceptable based on image data captured by the imaging device, and
   a memory that is configured to store an allowable value among a plurality of allowable values for positions of the serial numbers and a reference position,
   the plurality of allowable values being respectively set in accordance with positions of the securities on the printing sheet, the plurality of allowable values increasing from a leading edge side toward a trailing edge side of the printing sheet, wherein
   the CPU is configured to judge whether or not the serial numbers printed on the securities have been printed properly for each security by obtaining a difference between the position of the serial number and the reference position and comparing the obtained difference with the allowable value corresponding to the position of the security.

2. The securities character-number checking apparatus according to claim 1, wherein
   the CPU is configured to judge whether or not printing quality of components of the serial numbers is proper based on a criterion for judging the printing quality of the components of the serial numbers, and
   the criterion is the same for all of the securities.

3. A securities character-number checking method including
   capturing images of serial numbers printed on a plurality of securities printed on a printing sheet, and
   judging whether or not the serial numbers printed on the securities have been printed properly based on data of the captured image, wherein
   the judging includes
   obtaining, for each of the securities, a difference between the position of the serial number and a reference position stored in a memory by using a CPU,
   reading an allowable value corresponding to the security among a plurality of allowable values for the positions of the serial numbers stored in the memory by using the CPU, the plurality of allowable values being respectively set in accordance with the positions of the securities on the printing sheet, the plurality of allowable values increasing from a leading edge side toward a trailing edge side of the printing sheet, and
   judging whether or not the serial numbers printed on the securities have been printed properly by comparing the obtained difference with the read allowable value by using the CPU.

4. The securities character-number checking method according to claim 3 further comprising:
   judging whether or not printing quality of components of the serial numbers is proper based on a criterion for judging the printing quality of components of the serial numbers by using the CPU, wherein
   the criterion is the same for all of the securities.

* * * * *